April 30, 1940.  A. F. HICKMAN  2,198,616
VEHICLE SPRING SUSPENSION
Filed March 16, 1937  11 Sheets-Sheet 9
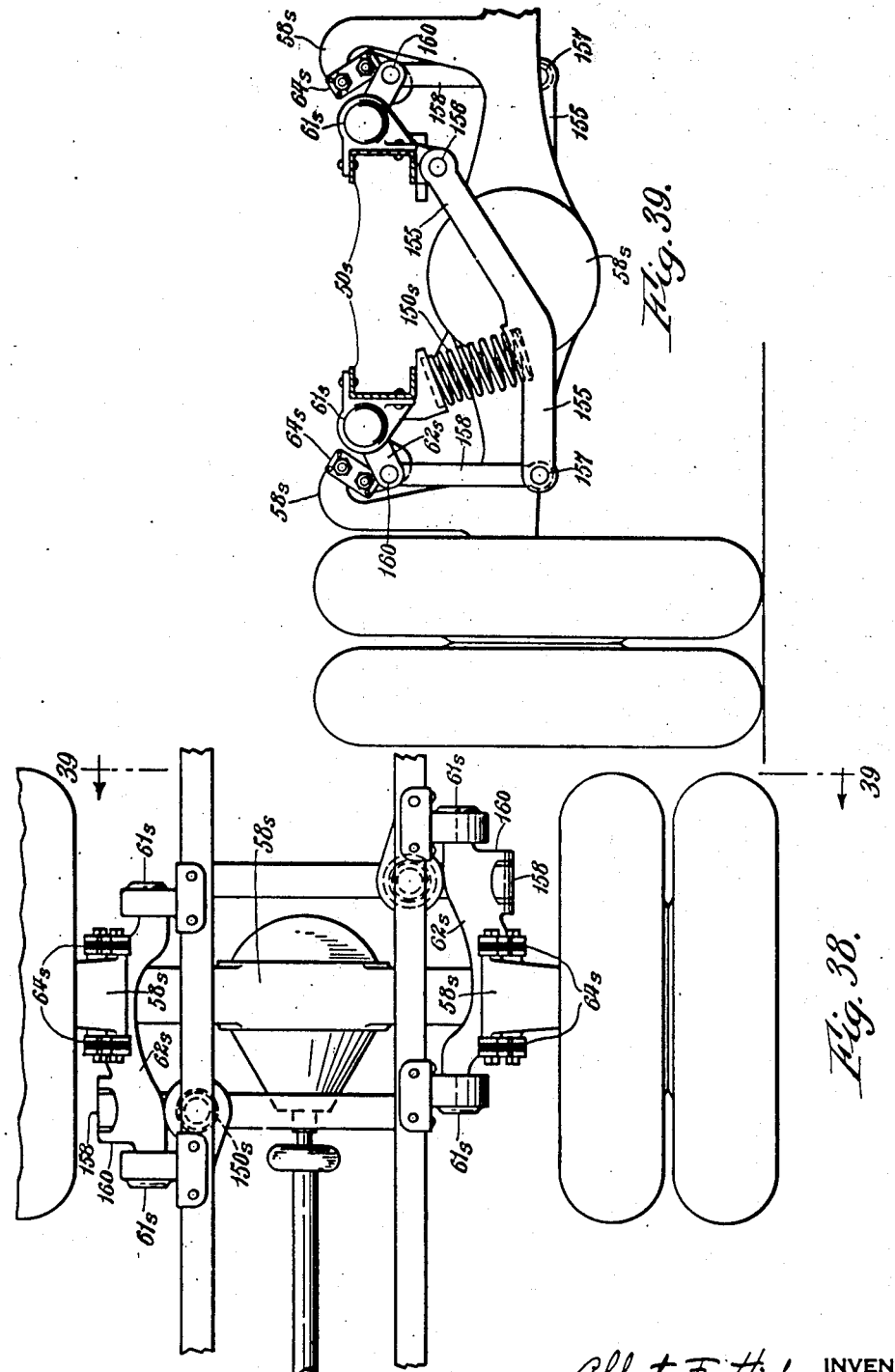

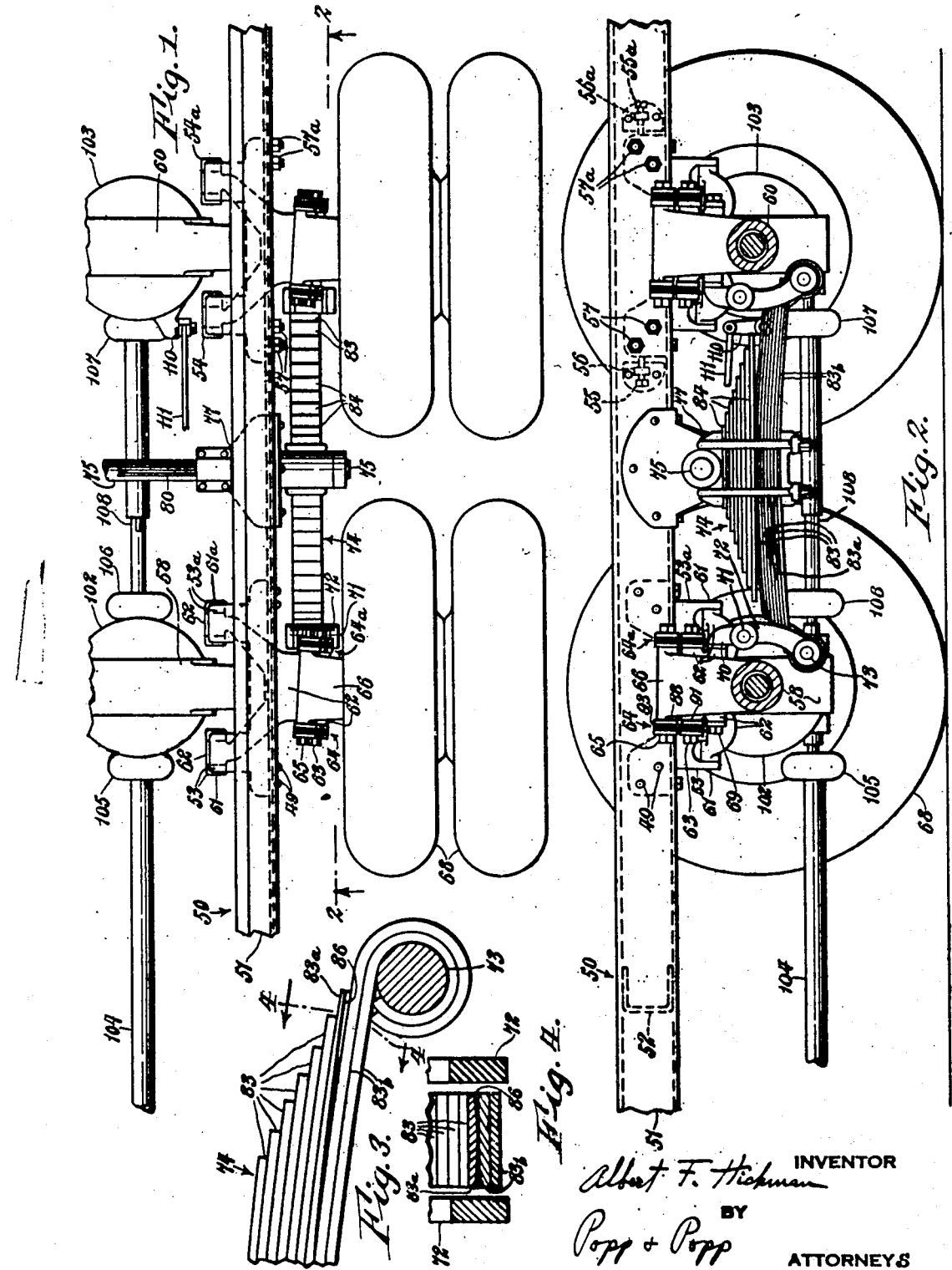

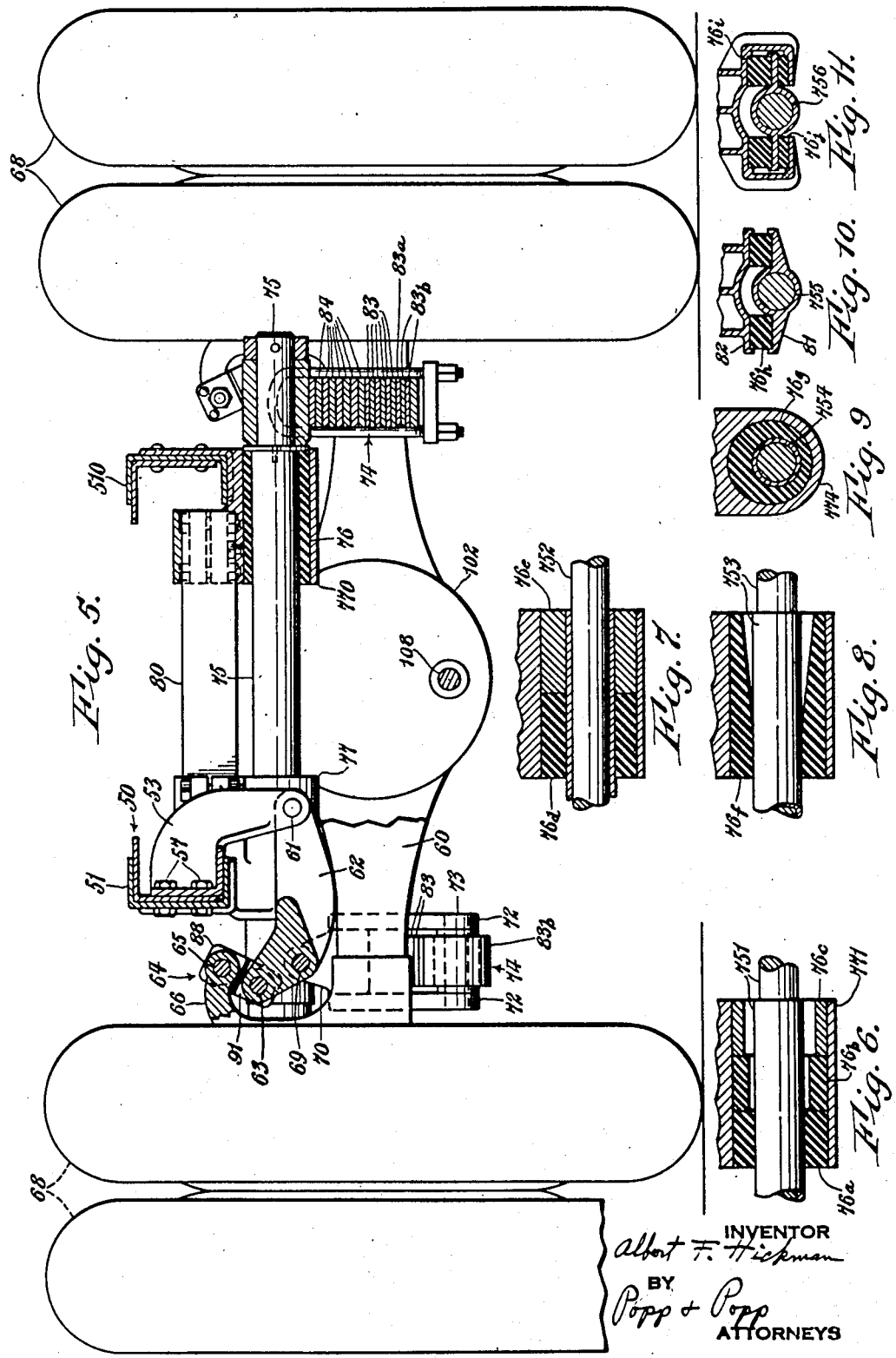

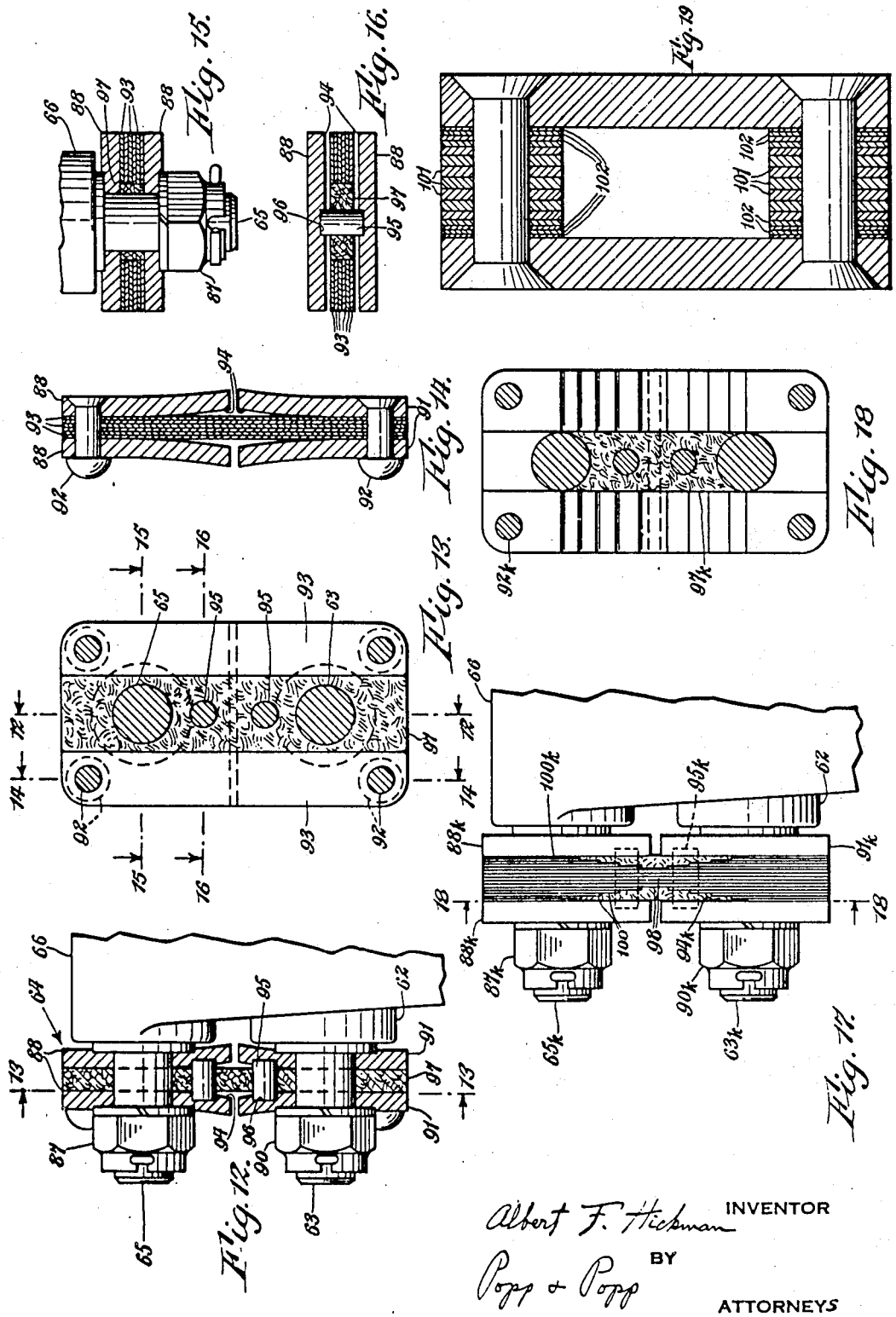

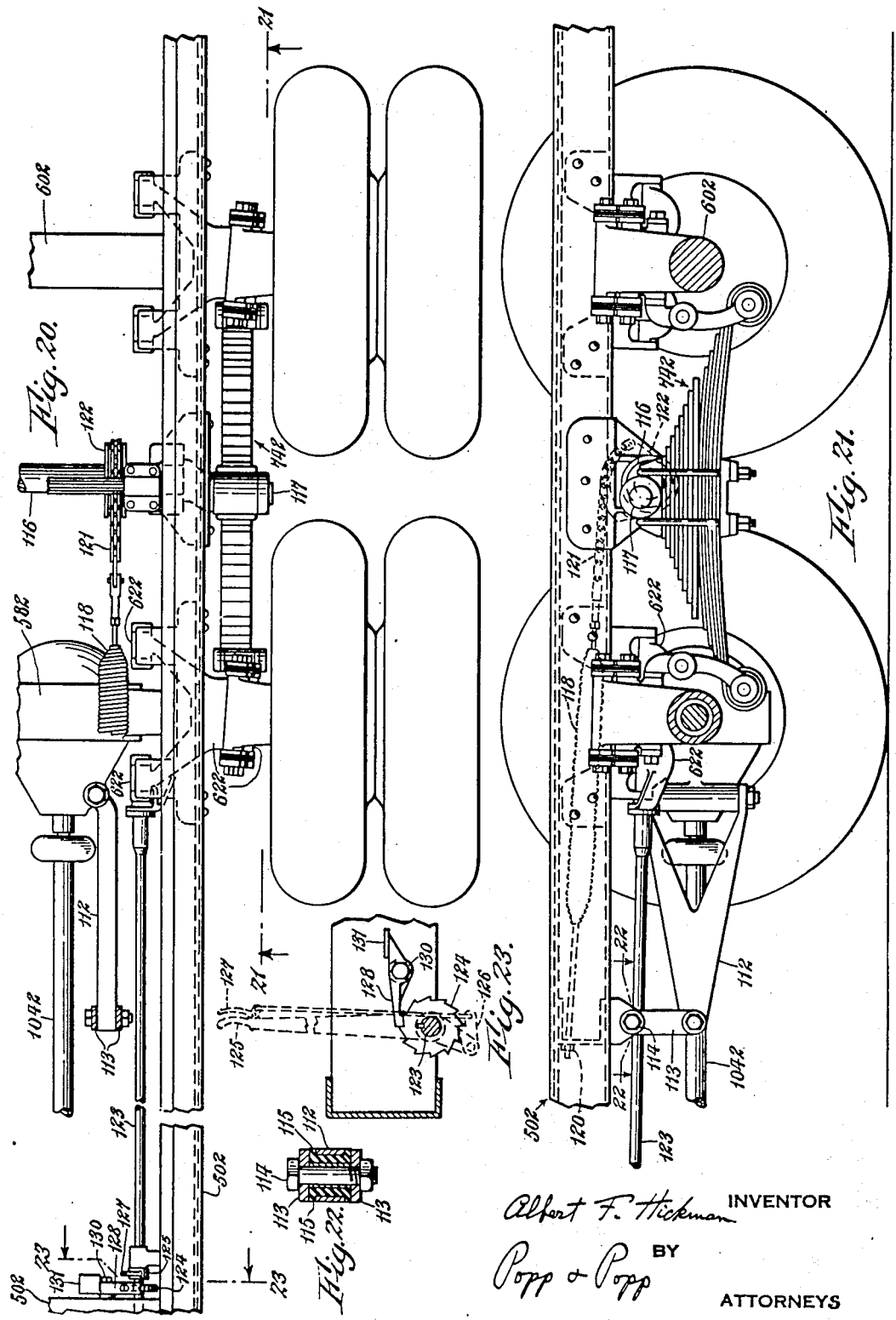

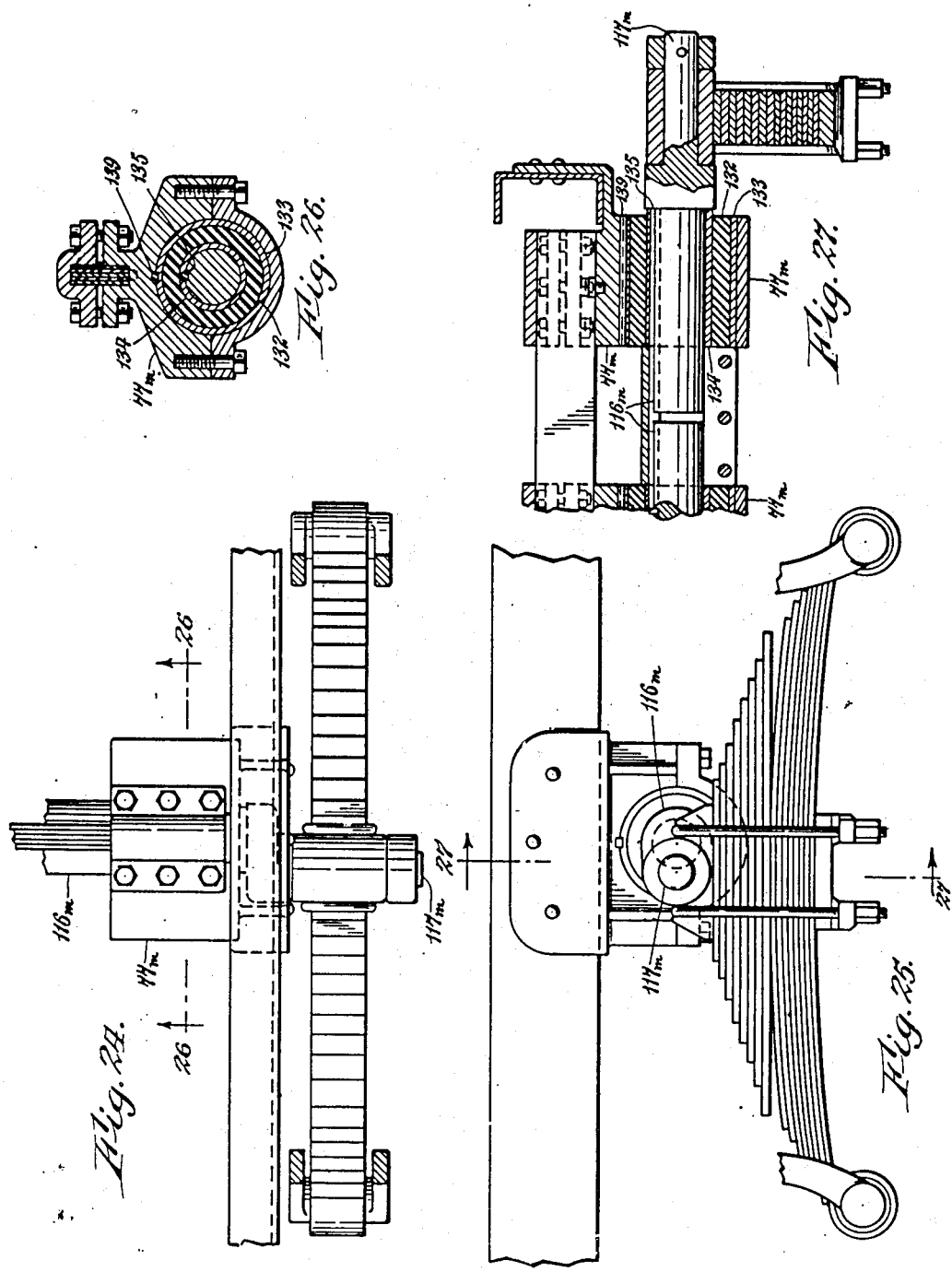

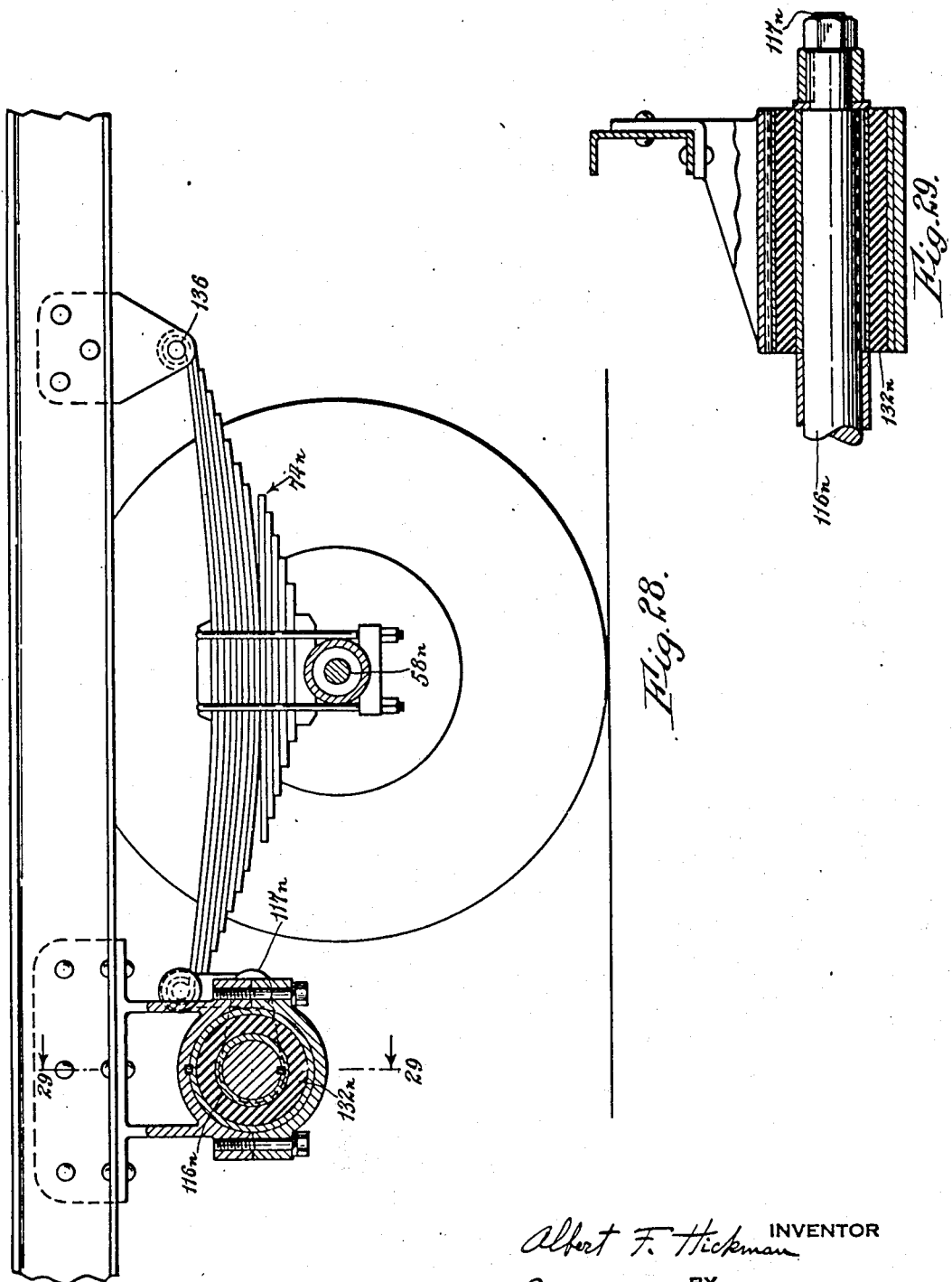

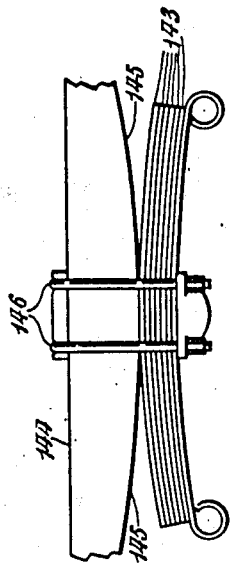
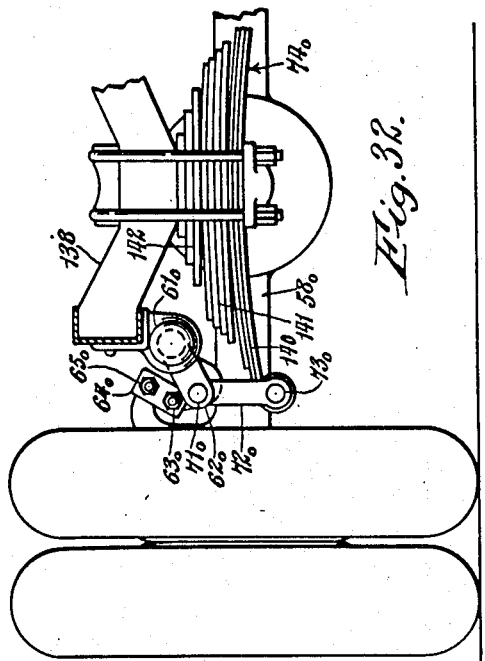
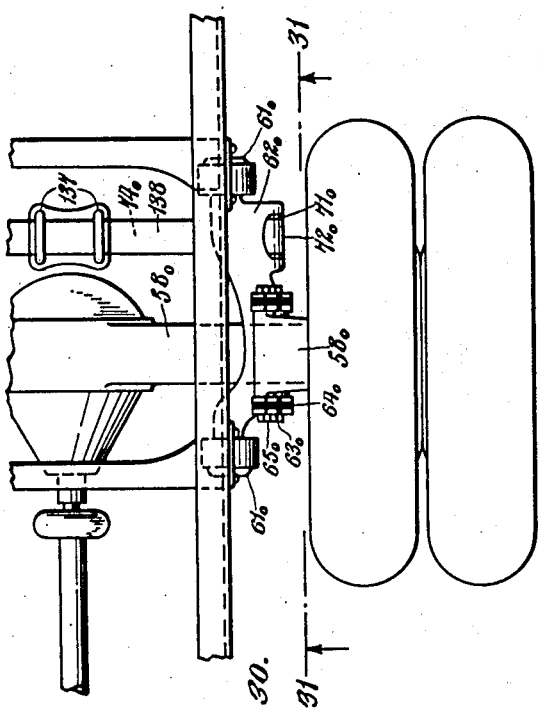
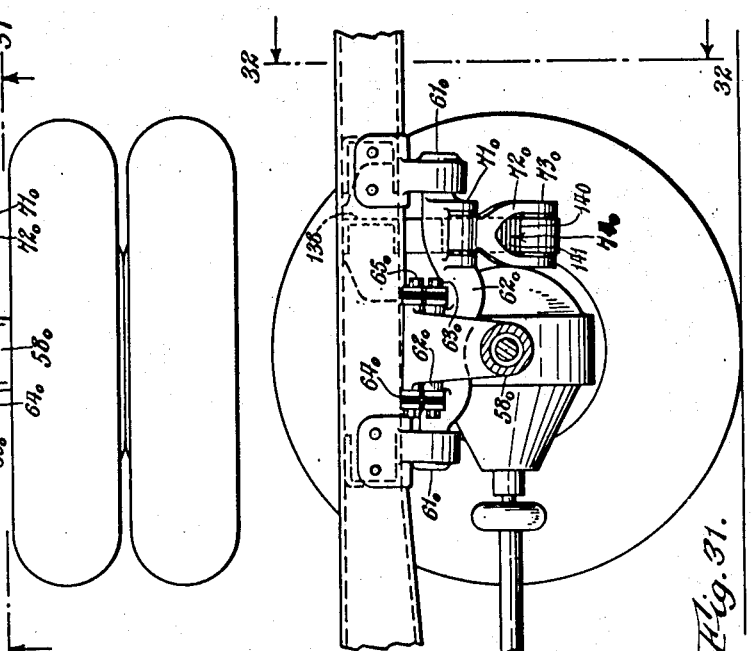

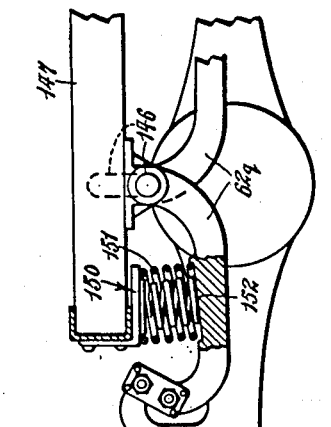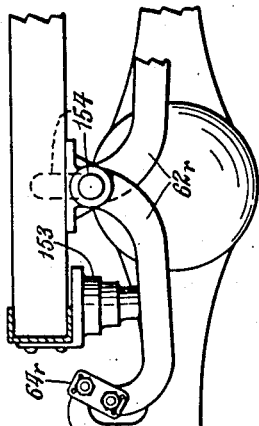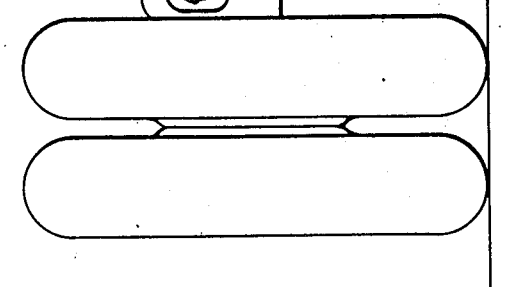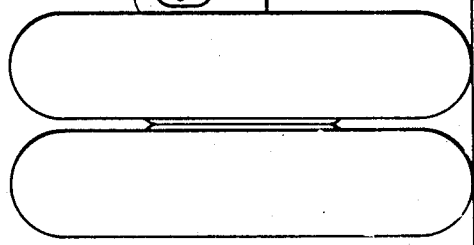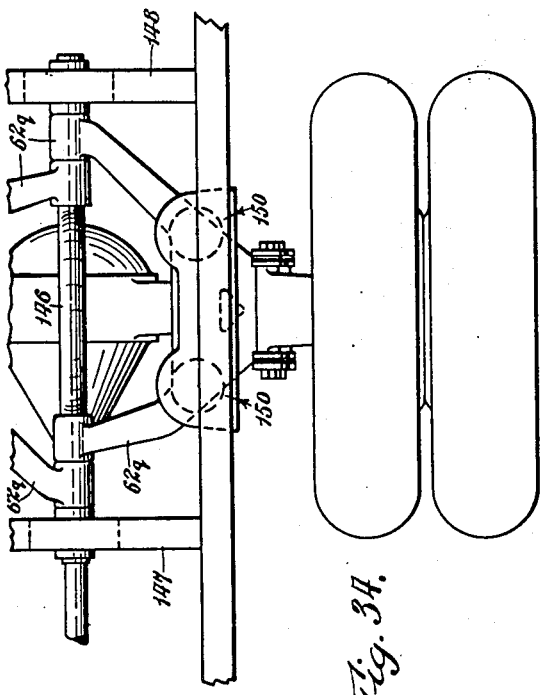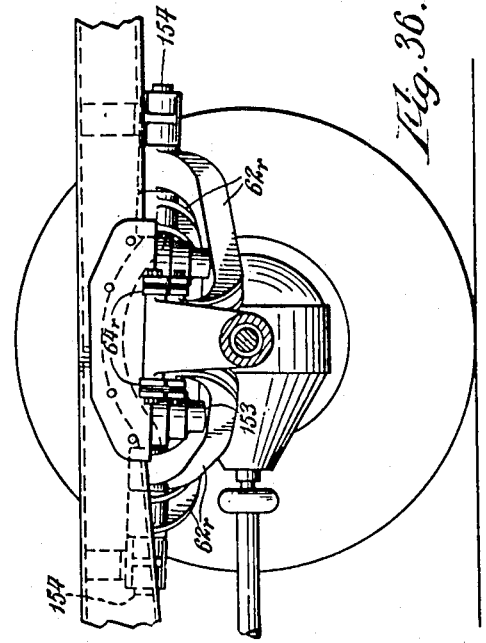

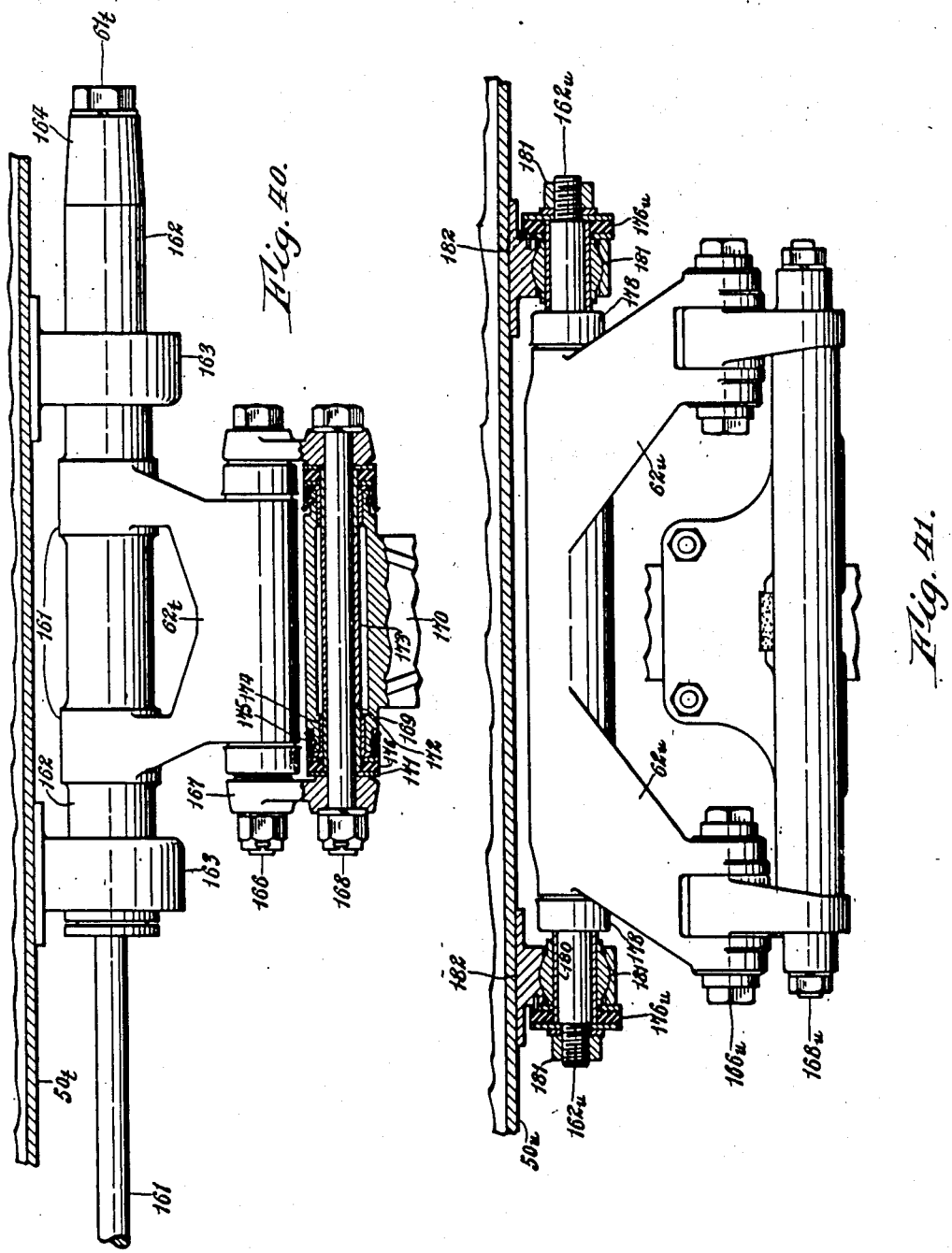

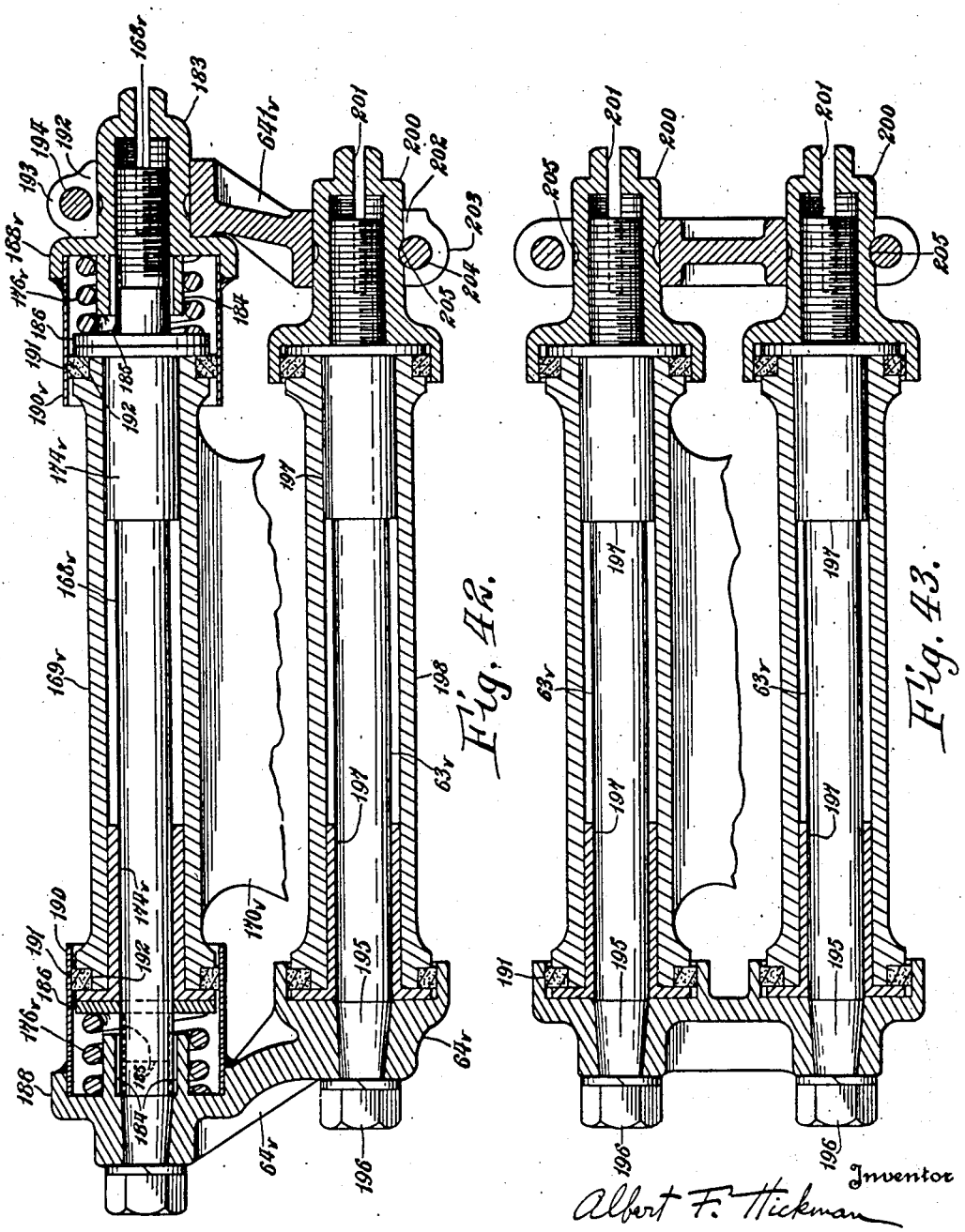

Patented Apr. 30, 1940

2,198,616

UNITED STATES PATENT OFFICE 2,198,616

VEHICLE SPRING SUSPENSION

Albert F. Hickman, Eden, N. Y., assignor to Hickman Pneumatic Seat Co. Inc., Eden, N. Y., a corporation of New York

REISSUED
JAN 21 1941

Application March 16, 1937, Serial No. 131,193

21 Claims. (Cl. 280—124)

This invention relates to a vehicle spring suspension, and more particularly to a type of spring suspension in which each axle is permitted to move against a geometric resilient resistance, both laterally and longitudinally, relatively to the vehicle frame, both when the vehicle has a low percentage of load variation and also when it has a high percentage of load variation.

The objects of the invention are—

1. To reduce lateral impacts from the axles against either the frame or the springs on a vehicle having either a high or a low percentage of load variation.

2. To provide a tandem axle spring suspension in which one or both of the tandem axles are self steering so that said tandem axles are automatically caused to travel parallel to each other when the vehicle is moving straight ahead.

3. To provide a tandem axle spring suspension in which one or both of the tandem axles are self steering so that, when rounding a curve, said tandem axles are caused to assume such an angle relatively to each other as will enable a pure rolling action to be attained and thereby reduce tire scuff and increase tire and gasoline mileage.

4. To accomplish all of the foregoing and, at the same time, permit a certain amount of rearward wheel movement whenever either wheel moves upwardly, and a corresponding certain amount of forward wheel movement whenever said wheel moves downwardly.

5. To accomplish the foregoing whenever both wheels of an axle are either elevated or depressed.

6. To accomplish these results in ample measure without imposing undue end thrusts on the various pivotal connections which connect the axles to the frame.

7. To accomplish all of the foregoing results even though the necessary resilient force be obtained from a spring which acts in a single plane and has an arithmetic rate of resilient resistance.

8. To enable the outer eye of a laminated spring to be twisted to a small extent without being opposed by an undue amount of resistance by said spring and, at the same time, without necessitating any expensive ball and socket joint to take care of this twisting action.

9. To provide a leaf spring which will provide a smooth geometric rate of resistance against flexure and not be noisy in action.

10. To provide a means of so supporting a member of a spring suspension that moderate amounts of load are supported by a soft resilient force which acts against a portion of said member remote from one of its points of support and enabling heavier loads to be supported by an additional resilient force which acts closer to said point of support, so as to increase the effective strength of the combination at the time when it is most needed.

11. To provide a plastic resilient support for a member of a spring suspension in which the main body of said resilient support is on that particular side of said member which receives the maximum amount of loading.

12. To provide a plastic resilient support for a member of a spring suspension in which all parts of said plastic support are given an equal opportunity to serve in the supporting of said member.

13. To provide a means of protecting a resilient shackle in a spring suspension from dust, and, at the same time, of lengthening the lubrication intervals of said shackle.

14. To provide a resilient shackle for a spring suspension in which very accurate assembly fitting may be obtained without necessitating expensive machine work on the parts and without involving any manufacturing operations (such as bending) which by their very nature cannot result in a product of uniform dimension.

15. To provide a resilient shackle for a spring suspension in which the resistance of said shackle to flexure is of accurate geometric nature and yet can be manufactured with the most generous and easily attained manufacturing tolerances.

16. To provide a dual-drive, tandem axle in which a heavy traction is obtained whenever it is needed, but in which power from one of the driving axles may be cut off whenever the traction requirements are small, and when, moreover, there would be an unnecessary loss of power and amount of wear if the wheels of both of the tandem axles were forced to attempt to maintain a constant synchronism between themselves and, if, at the same time, each of the wheels were forced to attempt to maintain a constant synchronism between itself and all of the other wheels and the particular part of the roadway over which that particular wheel is traveling.

17. To provide a tandem axle spring suspension in which each of the tandem axles may be resiliently supported by a leaf spring in such manner as to take care of a high percentage of load variation and yet be so arranged as to not impose excessive rotative torques or thrusts upon said spring.

18. To provide a tandem axle spring suspension in which movement of either one or both of the axles are, at the same time, opposed by a geometric resilient resistance and, in which either one or both of said axles are independently opposed by a total resilient force of such nature as to take care of a high percentage of load variation.

19. To provide a vehicle spring suspension in which a geometric resilient resistance is obtained in a manner which is very compact and requires no lubrication whatsoever.

20. To enable the one end of a vehicle which has the greatest variation in loads to directly bear the major part of the twisting moments resulting from such loads and at the same time, to transmit a sufficient portion of the twisting moments of such loads to the other end of the vehicles to substantially eliminate frame twisting by imposing a substantially equal twisting force upon both ends of the frame.

21. To provide a spring suspension having a leaf spring in which all of the metal is substantially equally stressed, whereby the effective life of the spring is lengthened because of not imposing on only a few of the leaves the major portion of the fatigue stresses.

22. To effect the result just mentioned without liability of at any time overstressing any of the metal of any of the spring leaves beyond the fatigue limit.

23. To provide a spring suspension in which longitudinal cushioning of the axle may, if desired, be effectively obtained in an inexpensive manner without the use of resilient shackles.

Numerous other collateral objects of the invention and practical solutions thereof are disclosed in detail in the herein patent specification wherein:

In the accompanying drawings:

Fig. 1 is a fragmentary top plan of a dual drive tandem axle form of my invention.

Fig. 2 is a vertical, longitudinal section thereof, taken on line 2—2, Fig. 1.

Fig. 3 is an enlarged, fragmentary, side elevation of the rear end of the semi-elliptic spring of Figs. 1 and 2.

Fig. 4 is an enlarged, vertical, transverse section thereof, taken on line 4—4, Fig. 3.

Fig. 5 is a rear elevation, with parts in section, of the construction of Figs. 1-4.

Figs. 6-8 are enlarged, fragmentary, vertical longitudinal sections, showing various modified means of connecting the cross shaft of Figs. 1-5 with the frame of the chassis.

Figs. 9-11 are enlarged, fragmentary, vertical, transverse sections, showing additional modified means of connecting the cross shaft of Figs. 1-5 with the frame of the chassis.

Fig. 12 is an enlarged vertical, longitudinal section through one of the resilient shackles of Figs. 1-5, taken on line 12—12, Fig. 13.

Figs. 13 and 14 are vertical, longitudinal sections through said resilient shackle taken on line 13—13 and 14—14 of Figs 12 and 13, respectively.

Figs. 15 and 16 are horizontal, transverse sections through said shackle taken on correspondingly numbered lines of Fig. 13.

Fig. 17 is an enlarged, side elevation of a modified form of resilient shackle.

Fig. 18 is a vertical, longitudinal section thereof, taken on line 18—18, Fig. 17.

Fig. 19 is a considerably enlarged, horizontal, transverse section through still another modified form of resilient shackle.

Fig. 20 is a fragmentary top plan of a tandem axle provided with my invention but having only one of the axles power driven and, furthermore, having the semi-elliptic leaf springs mounted on a crank shaft.

Fig. 21 is a vertical, longitudinal section thereof, taken on line 21—21, Fig. 20.

Fig. 22 is an enlarged, horizontal section through the upper end of the torque arm shackle of Figs. 20 and 21, taken on line 22—22, Fig. 21.

Fig. 23 is an enlarged, vertical, transverse section through the vehicle frame showing the means of adjusting the tension in the transferring, torsion bar of Figs. 20, 21, taken on line 23—23, Fig. 20.

Fig. 24 is a fragmentary, top plan of a tandem axle spring suspension having a modified means of resiliently restraining rotation of its crank shaft.

Fig. 25 is a fragmentary, side elevation thereof.

Fig. 26 is a vertical, transverse section through the crank shaft and associated parts of Figs. 24 and 25, taken on line 26—26, Fig. 24.

Fig. 27 is a vertical, longitudinal section through said crank shaft and associated parts, taken on line 27—27, Fig. 25.

Fig. 28 is a fragmentary, vertical, longitudinal section through the rear end of a two-axle truck equipped with my invention.

Fig. 29 is a fragmentary, vertical, longitudinal section through the crank shaft thereof, taken on line 29—29, Fig. 28.

Fig. 30 is a fragmentary, top plan of a two axle truck equipped with a modified form of my invention.

Fig. 31 is a vertical, longitudinal section thereof, taken on line 31—31, Fig. 30.

Fig. 32 is a fragmentary rear elevation thereof, taken on line 32—32, Fig. 31.

Fig. 33 is a diagrammatic end elevation of a modified form of semi-elliptic, leaf spring.

Fig. 34 is a fragmentary, top plan of a two axle truck equipped with another modified form of my invention.

Fig. 35 is a fragmentary, end elevation thereof.

Fig. 36 is a vertical, longitudinal section through the rear end of a two axle truck equipped with still another modified form of my invention.

Fig. 37 is a fragmentary, end elevation thereof.

Fig. 38 is a fragmentary, top plan of a two axle truck equipped with still another modified form of my invention.

Fig. 39 is a fragmentary end elevation thereof, taken on line 39—39, Fig. 38.

Figs. 40 and 41 illustrate how rubber may be used in the present invention in place of or in addition to the metallic, resilient shackles of the previous figures, whereby to permit a limited amount of longitudinal axle movement so as to allow the vehicle wheels to travel at a constant peripheral speed over a rough road without jerking the frame back and fourth.

Fig. 42 is a fragmentary and substantially vertical section through the axle pivot and crank arm pivots of a vehicle and illustrates a construction similar to Fig. 40 in that longitudinal cushioning is effected, in place of or in addition to the flexible shackles of Figs. 1-39, by permitting the axle post to slide longitudinally relatively to the shackles, this sliding being resisted by an adjustable resilient resistance which in this case consists of helical springs.

Fig. 43 is a fragmentary and substantially vertical section similar to Fig. 42 and illustrates how minor changes may be made in the construction of Fig. 42 to eliminate the sliding form of longitudinal cushioning wherever this is desired for reasons of economy of production or otherwise.

Similar characters of reference indicate like parts in the several figures of the drawings.

This patent application is a continuation in part of my patent applications for Vehicle spring suspension, Serial No. 637,444, filed October 12, 1932; Serial No. 696,803, filed November 6, 1933; Serial No. 713,161, filed February 27, 1934; Serial No. 752,488, filed November 10, 1934; Serial No. 61,200, filed January 28, 1936 and Serial No. 85,726, filed June 17, 1936.

Figures 1–19

Confining our attention for the present to Figs. 1–19, the vehicle chassis consists of the usual rectangular frame 50 consisting of a pair of longitudinal frame bars 51, 510 suitably joined together transversely by a plurality of cross frame bars 52 in the usual and well known manner. Frequently, in modern practice, the imposed loads are transmitted directly from the vehicle spring suspension to the body in which case the "frame" is little more than a template, but this question is of no importance here and need only be mentioned in passing to prevent any impression that the present invention requires such a relatively heavy frame as that shown.

Secured by rivets 49 or otherwise to the inner face of each frame bar is a pair of downwardly projecting front, bifurcated brackets 53, 53a (see Fig. 5). Arranged on said frame bar rearwardly of said front brackets are a pair of similar, downwardly projecting, rear, bifurcated brackets 54, 54a. These rear brackets are longitudinally adjustable, relatively to their companion frame bar 51 or 510, by means of adjusting screws 55, 55a which are threaded in suitable angle plates 56, 56a secured to inner vertical faces of the web of their companion frame bar. When the proper adjustment of these rear brackets 54, 54a has been suitably effected, the same are locked in position by fore and aft pairs of clamping bolts 57, 57a, it being understood that the holes in either the frame bars 51, 510 or the holes in the rear brackets themselves are either of elongated shape or are drilled sufficiently large to permit a small amount of longitudinal movement of said rear brackets relatively to their companion frame bar.

The front brackets 53, 53a are connected to the front driving axle 58 in a manner identical with the connection between the rear brackets 54, 54a and the rear driving axle 60 and hence only the former connection will be described.

Pivoted at its inner bifurcated ends at 61, 61a to the front brackets 53, 53a is a Y-shaped lever 62. The axis of said pivots 61, 61a slopes downwardly and rearwardly, i. e., it is inclined to the horizontal but lies in a plane parallel to a vertical plane passing longitudinally through the vehicle. Each of said Y levers 62 is pivoted at its outer end on lower pivots 63 to the lower ends of a pair of resilient shackles 64, 64a which will be subsequently described in detail. These shackles slope upwardly and rearwardly from said lower pivots 63, as shown in Fig. 2, and also slope upwardly and inwardly from said pivots 63, as shown in Fig. 5, and are pivotally connected at their upper ends at 65 to an axle post 66 connected with a companion front driving axle 58. This upward and inward inclined arrangement of said shackles tends to cause each axle to centralize itself in a direction transverse of the frame and enables the action of gravity to geometrically and resiliently resist any such movement of said axle away from its central position. This permits the vehicle body to move substantially straight ahead despite a certain amount of lateral movement of the axle. This is what I term the "lateral cushioning" of the vehicle frame relatively to one or more of the axles and is discussed at greater length in my earlier patents and patent applications. The novelty in the present construction does not lie in this "lateral cushioning," per se, but in the application of this very desirable type of cushioning to any end of a vehicle which has a high percentage of load variation, as will appear more clearly hereafter.

The oblique position of the axis of the pivots 61, 61a permits either wheel 68 to freely move a short distance rearwardly whenever said wheel rises and, concomitantly, permits said wheel to move a short distance forwardly whenever said wheel falls. This enables the peripheral speed of the wheel to be maintained substantially constant when travelling over irregularities, and, at the same time, enables the axis of the wheel to receive the sudden horizontal thrusts which inevitably result as a consequence of said uniform peripheral speed, without imparting these thrusts directly to the frame. Some of these forward and backward thrusts are imposed upon the axle before its inertia enables it to rise rearwardly or fall forwardly and these longitudinal thrusts are absorbed in the present invention by the shackles 64, 64a which are so constructed as to be resilient and thereby permit a limited amount of horizontal, longitudinal axle movement even in the absence of vertical movement of the axle such as occurs in practice when the irregularity is entirely absorbed by the tire.

The axes at the upper and lower ends of the shackles are also disposed at an acute angle with respect to a vertical plane positioned transversely of the vehicle. This angularity, in combination with the upward, inward slope of the shackles, renders each of the rear axles independently self steering, as will be explained hereinafter.

Pivoted horizontally and longitudinally of the vehicle at 69 at the outer lower part of each lever 62 is a rocking head 70 provided with a downwardly projecting arm. The latter is pivoted horizontally and transversely at 71 to the upper end of a link 72 whose lower end, in turn, is horizontally and transversely pivoted at 73 to the companion end of a companion, semi-elliptic, laminated or leaf spring 74.

The central, thick part of said semi-elliptic spring 74 is pivoted on a cross shaft 75 which is journaled horizontally and transversely of the vehicle in rubber cushions 76 arranged in companion cushion brackets 77, 77a. It is to be understood that the cross shaft 75 does not rotate to any appreciable extent in these cushion brackets 77, 77a, but only that the rubber cushions which are arranged between said brackets 77, 77a and said cross shaft 75 permit the latter to flex freely without any metallic, positive hinderance and thereby permit such frame weaving as is bound to occur in actual practive, particularly in heavy trucks. These rubber cushions 76 also deaden such noises as would occur if the two metallic members involved were in direct contact with each other and were, in addition, able to move relatively to each other. It is true that the present invention employs the form of laminated cross bar 80 which has been explained in detail in my patent application Serial No.

696,803, filed Nov. 6, 1933, for Vehicle spring suspension, but it is to be remembered that this cross bar 80 only controls the distance between the cushion brackets 77, 770 and not their angular position relatively to each other.

Obviously any increase in upward pressure upon the cross shaft 75 of Fig. 5 imposes an increase in pressure on the rubber cushions 76. This pressure may, if desired, be resisted geometrically by the modified type of rubber cushion shown in Fig. 6. In this case each cushion consists of three rubber rings 76a, 76b and 76c, all of which have their outer peripheries arranged within a companion cushion bracket 771 but have bores of different diameter and are preferably constructed of rubber, or other plastic composition, of different hardness, as indicated. The innermost or primary ring 76a is constructed of the softest rubber and engages at all times with the adjacent part of the cross shaft 751. As the vertical pressure imposed upon said cross shaft increases in an upward or downward direction, or in a rearward or forward direction, either one or both ends of said cross shaft 751 are allowed to be deflected, substantially arithmetically, against said primary soft ring 76a until the movement is sufficiently large to cause said cross shaft 751 to make contact with the secondary rubber ring 76b which is preferably, though not necessarily, constructed, as shown, of harder rubber than the primary ring 76a. This secondary ring is now able to aid in resisting lateral movement of said cross shaft 751 and hence, in combination with said primary ring 76a, is able to provide a more or less geometric resilient resistance to lateral movement of said cross shaft 751. In a similar manner, a still greater lateral pressure imposed upon said cross shaft 751 causes a still further lateral movement of said cross shaft until it makes contact with the large-bored and preferably hard rubber, outermost rubber ring 76c. It is to be noted that when the heaviest pressures are exerted upon said cross shaft 751, the point of support, relatively to the vehicle frame, is nearest its outboard end where the pressures are being received from the companion semi-elliptic spring 74.

In Figs. 7 and 8 are shown other modified means of providing a geometric, resistant, rubber connection between a cross shaft and its companion vehicle frame. In Fig. 7 is shown a pair of rubber rings 76d, 76e both of which are always in contact with their companion cross shaft 752 but provide a geometric resistance because of the fact that the inner ring 76d is constructed of relatively soft rubber while the outer ring 76e is constructed of relatively hard rubber. In Fig. 8 is shown a construction in which only a single rubber ring 76f is employed but in which the bore thereof is tapered so that, as the load on the cross shaft 753 increases, the point of support moves outwardly and the resistance increases. The bore shown in the rubber ring of this Fig. 8 is a tapered bore in which the taper is straight, but it is obvious that this taper may be so constructed as to be of curvilinear shape if it is desired to secure a resilient resistance having a different geometric characteristic.

Figs. 9-11 illustrate other modified forms of the invention wherein rubber cushions are used to maximum effective economical advantage. In Fig. 9 each end of the cross shaft 754 is normally disposed eccentrically with respect to the cushion bracket 774 so that the bulk of the eccentric rubber ring 76g, which is interposed between said cross shaft and said bracket, is located above said cross shaft so as to provide the maximum amount of rubber where its presence is most necessary. Similarly, in Fig. 10 a pair of rubber blocks 76h is disposed between horizontal flanges 81, which are suitably secured to the cross shaft 755, and a pair of horizontal flanges 82 which are suitably secured to the vehicle frame. In this particular construction it is preferred that the rubber blocks be securely cemented to the metallic surfaces with which they make contact, so as to properly take care of both horizontal forces and downwardly directed forces. In the previous constructions of Figs. 5-9, such a cementing renders the action of the rubber cushions more positive but is not ordinarily necessary for the preventing of relative movements of rubber and the metallic surfaces with which they make contact.

Fig. 11 is a construction similar to Fig. 10 except that heavy downward movements of the cross shaft 756 are resisted by compression of an additional pair of rubber cushions 76j instead of relying upon the tensile strength of the upper rubber blocks 76i as in Fig. 10. This construction of Fig. 11 is particularly adapted for use where trucks are to be driven at very high speeds over a very rough road or terrain as occurs, for instance, when trucks are used for army service.

As shown in Fig. 2, the lower eight leaves 83 of the semi-elliptic spring 74 are all very thin and are of equal thickness. The upper leaves 84 of said spring are, on the other hand, relatively thick and are also of equal thickness, but this thickness is larger than the thickness of the lower leaves 83. Furthermore, the upper, thick spring leaves 84 are relatively straight whereas the lower thin leaves are all provided with a certain amount of camber. The action of such a "compound," semi-elliptic spring is to provide a geometric rate of resistance in which the resistances to initial movement are progressively greater but very small in amount whereas resistances to increasing movement are progressively greater and relatively large in amount. In addition to this the construction of this leaf spring 74 is such that the normal life of all of its leaves is the same. This result is obtained by so proportioning the size and the shape of the lower leaves 83 as to have a proper fatigue strength based upon the very high total number of stress fluctuations to which they are subjected during their total life. The upper, thick leaves 84 are also so proportioned as to have a proper fatigue strength based on their total number of stress fluctuations but this latter number is relatively so low that these upper spring leaves may be considered as subjected to merely static loads and hence the allowable stress may be much higher than with the thin leaves 83.

As far as pure stress in the different leaves is concerned, such a differential in stress could be obtained by relatively minor changes in a conventional laminated spring. But another factor is involved, namely that the spring provides a geometric rate of resilient resistance with a very "flat" curve at normal loadings and a very rapid change to a "steep" curve at higher loadings. Applicant's spring attains both of these results simultaneously by having each infinitesimal portion of steel in each spring leaf stressed in accordance with its particular fatigue strength as encountered in actual service and, at the same time, by having the spring so arranged, as a unitary whole, as to be very soft for increments of load slightly greater than its normal load and rapidly, increasingly stiff for increments of load considerably different from its normal load.

When one end only of either the main driving axle 58 or the trailing driving axle 60 is raised or lowered, a certain amount of undesirable twisting strain is imposed upon the semi-elliptic spring, and the latter naturally opposes such a twisting movement and thus renders the spring suspension unnecessarily stiff as to this particular movement. Figs. 3 and 4 illustrate how applicant has arranged the present invention as to reduce such twisting strains on the spring leaves as a consequence of such an axle movement and has, concomitantly, enabled one or both of said axles to move more very freely and easily under such conditions. Applicant has obtained this effect by taper grinding the outer undersides 86 of that particular lowermost spring leaf 83a which is not connected to the pivots 73 at the lower ends of the links 72. Thus the two lower thin leaves 83b which are connected directly to the lower ends of the links 72 are thus enabled to twist slightly, when the one end only of either axle rises or falls, without requiring that the spring leaf 83a and all of the spring leaves above the same be also twisted or tilted. This taper grinding of the third-from-the-bottom spring leaf 83a does not materially affect its strength or flexure characteristics because said grinding causes the outer ends of said leaf to be of substantially, equal-strength, cantilever form. In other words, this removal of metal at the ends of said spring leaf 83a has no material effect on its resilience or its stress characteristics and only an insignificant effect on its inertia and momentum, but does enable the leaf spring as a whole to be more easily twisted.

The resilient shackles 64, 64a may be constructed as shown in Figs. 12-16 as follows:

Securely clamped to the axle pivot 65 by a clamping nut 87 is a pair of heavy-gauge, sheet metal, upper shackle heads 88. Similarly clamped to the crank arm pivot 63 by a clamping nut 90 is a similar pair of lower shackle heads 91. Clamped between said upper and lower pairs of shackle heads 88, 91 and secured thereto by rivets 92, are two sets of laminated, metal, resilient strips 93 which carry the tensile stress between the pivots 65 and 63 and allow the latter to move longitudinally relatively to each other and to swing a small amount out of parallelism relatively to each other whenever their companion axle rises or falls, this movement being due to the fact that the pivots 65, 63 are not parallel to the frame pivot or fulcrum 61, 61a of the Y-shaped lever 62.

These laminated strips 93, being resilient, permit the pivots 65 and 63 to move a short distance longitudinally relatively to each other and also to twist slightly relatively to each other as just explained. Resistance to both of these movements should be, and in the present invention is, of a geometric nature, as explained in detail in my pending application for Vehicle suspension, Serial No. 85,726, filed June 17, 1936. This geometric effect is obtained by limiting the flexing of the laminated strips 93 by curvilinear faces 94 formed on the upper and lower shackle heads 88 and 91. To obtain such curvilinear faces 94 by a machining operation is expensive, and die casting is, of course, out of the question. On the other hand, while these heads are made of heavy sheet metal and can be bent to shape, it is well known that the product of such bending is sure to be variable in actual production practice. In the present invention all of these difficulties have been surmounted by first bending said heads 88, 91 a relatively small amount and then assembling and clamping them together (with the laminated strips 92, etc., in place), with a small spacing pin 95 interposed between each pair of heads, said pin being received at its opposite ends in shallow, cylindrical depressions 96 suitably formed in the opposing faces of each pair of heads. Both the length of these pins 95 and the depth of the impressions 96 can be easily machined within close tolerance limits and hence the final position of the curvilinear faces, relatively to each other, can be held within fine tolerance limits despite the fact that they are bent into their final shape and are not machined.

Interposed between the two sets of laminated, resilient strips 93 is a felt block or lubricating wick 97 which is saturated with oil when the shackle is assembled. This felt wick is held in place by being suitably cut or punched out at its upper and lower ends to encircle the axle pivot 65, the crank arm pivot 63, and the spacing pins 95. Said wick 97 is saturated with lubricating oil or light grease when the shackle is assembled at the factory and this has been found, in actual practice, to effectively lubricate the laminated strips 93 for a very long period of service and prevents said strips from rusting while in service and also prevents dust from working into the interior of the shackle.

It will be noted in Figs. 1 and 2 that the resilient strips 93 are shown as normally disposed in a plane which is perpendicular of the axes of the pivots 65 and 63. To effect such a result it is, of course, necessary to so form the resilient strips 93 that they have an initial curvature prior to being installed in the vehicle. This is deemed to be the preferred arrangement in that it reduces the end thrusts on said pivots 65 and 63 but the present invention is not confined to such a normally perpendicular positioning of the shackles because, particularly in light and/or inexpensive vehicles, the resilient strips 93 may be normally arranged in a plane which is vertical and disposed transversely of the vehicle. In such case the shackles may be manufactured symmetrically without providing any initial flexure in the resilient strips 93.

Figs. 17 and 18 illustrate a modified form of shackle in which the shackle heads 88k and 91k have straight inner faces, the geometric feature of the resilient resistance of the shackle being obtained by the arrangement of the laminated strips themselves. In this case the laminated strips are of variable length, the central five strips 98 extending the full length of the shackle, while the outer strips 100 are progressively shorter in length. All of the strips are suitably secured at their outer ends to the shackle heads 88k, 91k by rivets 92k. Thus, despite the fact that all of the strips are of equal thickness, whenever the shackle is increasingly flexed, the inner flat faces 94k of the heads 88k and 91k make abutting contact with the tips of the successively longer strips 100 and thereby cause the shackle as a whole to resist flexure at an accelerated or geometric rate. As far as manufacturing tolerances are concerned this type of shackle does not need any spacing pins 95k at all, but to obtain compactness it is desirable to have the strips as short as possible and this results in the outermost strip 100k of the graduated strips 100 being so short as to not secure a solid base of support for the nuts 87k and 90k and thereby tending to thrust the outboard ends of each pair of shackle heads 88k and 91k toward each other. Any such tendency is prevented positively and accurately by the aforesaid spacing pins 95k.

If desired a felt block or lubricating wick 97k may be interposed between the sets of resilient strips in a manner similar to the lubricating felt 97 of Figs. 12-16. In the present case, however, the felt 97k does not encircle the pivots 65k and 63k inasmuch as the latter are in contact with all of the resilient strips and hence are able to prevent any possibility of the graduated strips 100 moving inwardly toward each other and interfering with the lubricating felt 97.

Fig. 19 shows a modified form of resilient shackle which is similar to the form of Figs. 17, 18 except that, instead of all of the resilient strips being of equal thickness, the central resilient strips 101 are relatively thick while the outer resilient strips 102 are progressively thinner. This arrangement equalizes the effective stress in the various strips either if we assume that the progressive increase in length of the strips is substantially arithmetic as indicated in the construction of Figs. 17 and 18, or if we assume that the progressive increase in length is of geometric character. This equalization of the effective stress results from the fact that the number of vibrations to which the outer strips are subjected during the total life span of the shackle is considerably greater than the number of vibrations to which the inner strips are subjected. This is because every movement of the shackle causes a relatively sharp flexing of the outer strips whereas only the larger movements of the shackle cause any sharp bending of the inner strips. It is well known that a thin strip can be bent around a given radius with less maximum stress imposed upon the outer fibers than in the case of a thicker strip. Hence, even if the actual radius of curvature is the same for both the outer and inner strips, the static stress on the thinner outer strips is less and, because of their larger total number of vibrations per life is greater, the effective stress is caused to be the same in all the strips of the shackle. In other words, this shackle is like the one horse shay in that, when any one strip reaches the end of its life and breaks, all of the other strips have also reached the end of their lives too. This is, of course, a theoretical ideal and cannot be strictly obtained in actual commercial practice, but it is the ideal to be sought and forms the proper basis for the design of the various parts of the shackle.

A tandem axle arranged at the rear of a truck and in which both of the tandem axles are power driven unquestionably provides a superior traction inasmuch as all of the wheels at the rear end of the truck are driving wheels, and hence the full weight imposed upon the rear end of the truck is utilized in obtaining traction. On the other hand, after the truck has been brought up to a relatively high speed and the inertia of the vehicle has been overcome any such dual axle traction is not only unnecessary in the driving of the car at the desired rate of speed, but is extremely detrimental in that it tends to cause all of the rear wheels to travel at a constant rotative speed even though their natural inclination is to each travel at a speed which accords with the particular terrain being traversed by that particular wheel.

In the present invention applicant has so organized the various parts that at low speeds both of the rear axles are caused to provide their full driving function but that at high speeds the power is unconnected from one of the erstwhile drive axles. Fig. 1 shows the front axle 58 provided with a conventional front differential 102 and the rear axle 60 provided with a conventional rear differential 103. The front axle 58 is at all times connected to the usual and well known transmission gear box of the vehicle through the conventional propeller shaft 104 and the rear, main universal joint 105. The rear axle 60 may receive its power in any suitable manner, as for instance, from the front differential 102 through a pair of universal joints 106, 107 and a splined drive shaft 108. The rear differential 103 is provided with a clutch lever 110 which is adapted, by a suitable clutch (not shown), to couple or uncouple the power from said drive shaft 108 to said rear differential 103. This clutch lever 110 is connected to the transmission of the vehicle by an actuating rod 111 in such manner that whenever said transmission is in the lower range of gears (for instance first or second gears) said clutch lever 110 is automatically actuated to engage the clutch in the rear differential 103, whereas, when the transmission is in the higher range of gears (for instance third or overdrive gears) said clutch lever 110 is automatically actuated to disengage said clutch in the rear differential 103. It is to be understood, of course, that, when the transmission is in reverse gear, power is delivered to both of the rear axles.

It is, of course, quite possible to couple and uncouple the one or other of the tandem axles by some suitable manual apparatus and the latter is deemed to come within the scope of the present invention. It is well known, however, that the human element should never be relied upon if it can be replaced by some automatic apparatus or other. The present invention is ideal in this respect in that when the truck driver throws in first gear, the power is automatically caused to be delivered to both of the tandem rear axles 58, 60 through their respective differentials. Such an arrangement may, if desired, be continued when he throws in second gear. But in any event, as soon as the truck has sufficiently overcome its initial inertia to warrant shifting of the gear shift to a relatively high gear, for instance, third gear, the uncoupling of the rear axle 60 is automatically effected by this shift without any mental effort on the part of the truck driver. If the truck is being used to pull some object which is very heavy, such as a cement mixer, the truck driver will automatically be forced to stay in low or second gear and power will automatically be supplied to both rear axles and full traction thereby obtained. The same general condition obtains if the truck, either empty or loaded, strikes a hill which is sufficiently steep to require one of the lower gears. When the truck driver throws his gear shift into neutral and comes to a stop or if he materially reduces his speed and has to drop into a lower gear to pick up speed again, power will automatically be delivered to both of the tandem axles. It is obvious that the present invention in no way prevents any wheel from being equipped with a brake, so that, despite the fact that the traction is reduced at high speeds as far as propulsion is concerned, it is not reduced one iota as far as braking is concerned.

It is to be noted, in this form of the invention, that the starting and brake torque of the tandem axles is not transferred to the semi-elliptic springs 74 but is carried directly through the shackles 64, 64a and Y arms 62 to the frame. This permits the springs to carry the vertical loads only and do not have to be made heavy enough to carry momentary torque loads and hence do not have to be made so heavy as to interfere with their resilient characteristics in normal operation. It is also of great significance in the present invention that said semi-elliptic springs are not forced to carry any transverse loads which in actual practice are very heavy, and are imposed upon only those leaves of the ordinary, semi-elliptic spring suspension which are connected to the spring eyes 73. Also it is because of the fact that, in the present invention, the semi-elliptic springs 74 only carry the vertical loads, that their central bearings on the cross shaft 65 may be constructed very light and the cross shaft itself very light and the latter mounted in such rubber cushions as those shown in Figs. 5–11, as would absolutely be unfeasible in a spring which is forced to carry torque and/or transverse loads. It is true that, in the present invention, the lowermost of the thin spring leaves 83 are subjected to twist, but this is only because of the arcuate movement of the pivot 69 about the fulcrums 61, 61a and this arcuate movement is very small and does not constitute a direct lateral thrust on said spring leaves and the strains that are imposed are very considerably reduced by the tapered shape 86 of the third-from-the-bottom leaf 83a.

The pivots 61, 61a of the levers 62 incline to the horizontal, as previously described, to enable each wheel to move slightly rearwardly when it rises, and, conversely, to move slightly forwardly when it descends, so as to enable the horizontal component of the wheel axis movement to remain substantially constant, even though its peripheral speed is substantially constant but is travelling over a rough road.

In addition to this, the pivots 65 and 63 of the shackles 64, 64a are inclined with respect to a vertical plane positioned transversely of the vehicle. The reason for this angularity is as follows:

When the vehicle is travelling straight ahead, if the tandem axles 58, 60 are not parallel for any reason, they will automatically assume a parallel position because of the fact that any rear axle which is out of line will tend to follow a horizontal arc and this tendency, due to the lateral friction between the tires and the roadway, will cause a lateral movement of the axle relatively to the frame. Due to the fact that the shackles normally extend upwardly and inwardly, as shown in Fig. 5 and due to the further aforesaid angularity of the shackle pivots with respect to a vertical, transverse plane, this lateral movement is automatically caused to be translated into a slight turning movement of the whole axle, and this turning movement will continue until both of the rear axles are in line with each other. Such a movement, naturally, causes a change in the angularity of the shackles at the opposite ends of each axle and this change is resisted by gravity which, due to the obliquity of the shackles, is caused to act in a geometric manner. It is obvious that this self-steering movement should be as small as possible because of this gravitational resistance to lateral axle movement, and it is for this reason that the position of the rear axle in a horizontal plane is rendered adjustable by the adjusting screws 55, 55a and clamping bolts 57, 57a so as to reduce as much as possible the need for this self-steering. This adjustment permits the rear axle 60 to be properly aligned in the assembly room at the time of manufacture and also permits said axle to be brought back to alignment if frame distortion has occurred in use, as is very frequently the case.

The fact that the rear axles 58, 60 "trail" each other also occurs when the vehicle is making a turn on the road. In this case, just as when going straight ahead, the tires naturally tend to resist lateral scuffing and tend to push the axle laterally and, as a consequence, the whole axle moves obliquely to eliminate this scuffing. Thus when the vehicle is making a turn the two rear axles are caused to automatically move to such an oblique position, relatively to each other, as will cause their axes to intersect the axes of revolution of the two front wheels and will enable the vehicle to make the turn without tire scuffing. This action occurs when either the vehicle is steered around a long turn in the road or if it is steered sharply on a straight road, as, for instance, when overtaking a slow vehicle ahead, or otherwise avoiding some obstruction or other. It is to be understood that this action also takes place to some extent when a tendency to tire scuffing occurs because of one wheel or a pair of wheels at one end of an axle having a diameter different from the diameter of the wheel or pair of wheels at the other end of the same axle.

*Figures 20–23*

In this tandem axle construction, the front axle 582 is driven by the propeller shaft 1042 while the rear axle 602 is not power driven but is merely a trailing axle, this construction being particularly adapted for lighter and less expensive vehicles. Because all of the starting torque is imposed upon the drive axle 582, the latter is preferably (though not necessarily) provided with a conventional form of torque arm 112 whose front end is connected to the lower end of a torque link 113. This eliminates the need of a special, stronger connection between the drive axle 582 and the frame, than that used between the trailing axle 602 and the frame. The upper end of the torque link 113 is pivoted at 114 to the vehicle frame and, because of the fact that the drive axle must be free to tilt freely in a plane which is vertical and transverse of the vehicle, the upper end of said torque link is connected through a resilient rubber or other similar connection 115 to the main frame of the vehicle.

In this form of the invention is shown a modified means of connecting the central part of the semi-elliptic spring 742 with the vehicle frame. Journaled horizontally and transversely on the main frame 502 is a two-piece crank shaft 116 having crank pins 117 at its outer ends. Rotation of this crank shaft 116 is resiliently restrained in any desired manner, for instance by the helical spring 118 which is connected at its front end at 120 to the main frame of the vehicle and is connected at its rear end to a chain belt 121 which is wrapped around a smooth-faced, flanged segment 122 which is suitably secured to the crank shaft 116.

Journaled intermediate its ends upon each of said crank pins 117 is a semi-elliptic, leaf spring 742. Each crank pin 117 may be located exactly midway of the ends of its companion leaf spring 742, as shown, so as to obtain a certain distribution of load on the two rear axles 582, 602, or said crank pin may be either adjustably or fixedly located any desired distance forwardly of this central position so as to increase the proportion of load on the drive axle 582 as compared with the load on the trailing rear axle 602. It should be noted, in passing, that when the crank pins 117 are exactly midway of the ends of their companion leaf springs 742, the load distribution is not 50-50, as will be shortly explained.

It is obvious that the construction of Figs. 1-19 could be equipped with this crank shaft 116, if desired.

The rear end of a truck is subjected to very heavy pressures, and these pressures are practically always laterally unbalanced when the truck is in motion. The percentage of the effective unbalance is usually rather low, particularly when the truck is heavily loaded and travelling at a relatively high speed, but nevertheless causes a tendency to tilt the rear end of the vehicle frame in a vertical transverse plane. If none of this tilting effect is transferred to the front end of the truck the result is that the entire truck frame is twisted, as is well known in actual practice. On the other hand, if a large portion of the resilient forces at the rear end of a truck were transferred to its front end, the effective force at the front would be the difference of the pressures at the rear end of the truck and this would cause the front end to heel over in the correct direction but altogether excessively in amount. Also the mechanism for transferring such heavy stresses from the rear to the front of the truck would be very heavy and costly.

In the construction of Figs. 20-23 is shown a means whereby a sufficient portion of the forces which cause tilting at the rear end of the vehicle are transferred to the front end of the vehicle, so as to eliminate all twisting strains, as far as tilting forces originating at the rear end of the vehicle are concerned, by causing the frame to tilt an equal amount at the front and back ends. This means consists primarily of a pair of torsion rods 123 each of whose front ends is adjustably secured through a ratchet wheel 124 to the front end of the vehicle frame, while its rear end is secured to the companion, Y shaped lever 622 of the front tandem axle or driving axle 582. Hence, as the one or other of said Y levers 622 moves up or down, this movement is translated into a torsional strain which is carried to the front end of the vehicle frame which latter is then tilted in the one or other direction in accordance with the tilt at the rear end of the vehicle. This eliminates any twisting frame stress as far as any tilting which may originate at the rear end of the vehicle is concerned.

The amount of the torsional strain thus transferred to the front end of the vehicle is, of course, a function of the diameter, length and metal of the torsion rod and this is properly designed to take care of such stresses as result from maximum loading. It is well known, however, that the variation of load on a truck is considerable, and hence provision has been made in the present invention whereby the amount of stress transferred may be adjusted if desired. This consists of a regulating handle 125 whose hub is journaled on the front end of its companion torsion rod 123 and carries the usual spring actuated dog 126 which may be tripped in the usual manner by a trip lever 127. A suitable pedal actuated pawl 128 is also provided to restrain the ratchet wheel 124 from rotating relatively to the vehicle frame, the same being pivoted at 130 on the vehicle frame and having a treadle plate 131 at its inner end adapted to be depressed by the foot of the vehicle operator.

While the primary purpose of adjusting the effective torsion of the torsion rods 123 is to eliminate frame twisting, it should also be noted that in an emergency, the same may be used to impose a much heavier than usual downward force on the drive axle 582 and thereby supply the same with the required greater driving traction.

The use of torsion rods 123 lends itself particularly well to the construction of Figs. 20-23 in that it imposes an additional resilient pressure on the front axle 582 and hence provides a load distribution which is not 50-50 even though the leaf springs 742 are constructed symmetrically with the crank pins 117 journaled exactly midway of their ends. It is to be understood, however, that such a pair of torsion rods may also be used in the construction of Figs. 1-19, but as the load distribution in such a dual-drive, tandem axle construction is preferably always 50-50, it is preferred in that case that the strain to which the torsion rods are subjected be derived from only the front axle but that the semi-elliptic spring be unsymmetrical to preserve the 50-50 load distribution.

*Figures 24-27*

The tandem axle construction of Figs. 24-27 shows a means of eliminating the helical spring 118 of Figs. 20-23. This result is obtained by employing a rubber sleeve 132 intermediate each end of the two-piece crank shaft 116m and its companion frame bracket 77m. It is to be understood that, in the position of the parts shown in the drawings, each of the rubber sleeves is under torsional strain tending to turn the crank shaft in a counter-clockwise direction, as seen in Fig. 25, and hence resiliently resisting upward movement of the crank pins 117m.

To enable the resilient rubber sleeves 132 to be readily replaced after a certain period of use, each of the same is preferably cemented to an outer metal tube 133 and an inner metal tube 134, the latter being connected to the companion end of the crank shaft 116m by a key 135, and the former being connected to its companion bracket 77m by a key 139.

*Figures 28-29*

This modified form of the invention also employs a rubber sleeve 132n to resiliently restrain rotation of a transversely disposed, double-ended crank shaft 116n, but in this case only a single rear axle 58n is employed, the same being secured at each of its ends to the central part of a longitudinally disposed, semi-elliptic, leaf spring 74n. The one end of each of said leaf springs is pivoted at 136 to the vehicle frame while its other end is pivoted on the crank pin 117n of the companion end of the transverse crank shaft 116n.

*Figures 30-32*

This modified form of the invention illustrates how the lateral-cushioning constructions of Figs. 1-27 may be modified for use in a truck requiring only a single rear axle 58o and employing only a single, transverse, leaf spring 74o. The central part of the latter is secured by a pair of U bolts 137 to a transverse frame member 138 (see Fig. 32) while its outer ends are pivoted at 73o to the lower ends of a pair of links 72o. The upper ends of these links are pivoted at 71o to a pair of Y shaped levers 62o which are fulcrumed at 61o on the vehicle frame. The outer ends of these Y levers 62o are pivoted at 63o to the lower ends of resilient shackles 64o whose upper ends are pivoted at 65o to the drive axle 58o.

This form of the invention also illustrates how a leaf spring 74o may be constructed to provide a very smooth geometric, resilient resistance, by being constituted of three distinct sets 140, 141 and 142 of spring leaves, the leaves in each set being of equal thickness, but the thickness of the leaves in each set being different from the thickness of the leaves of the other sets.

It is to be noted that this form of the invention is similar to that of Figs. 1-19 in that the leaf spring 74o carries the vertical loads only and that the torque forces imposed upon the axle are carried to the frame through the shackles 64o and levers 62o without requiring any special radius rods or "wishbones" to effect this result. In addition this construction provides the lateral cushioning feature, namely that the axle is geometrically resiliently urged toward a central position in a vertical, transverse plane, but is not positively held in this central position and that, therefore, the axle may swing up and over at either one of its ends or may move bodily laterally a limited amount without being forced to move laterally with the body. It will also be noted that the axis of the pivots 63o and 65o are normally disposed at an angle to a horizontal plane and also at an angle to a vertical, longitudinal plane, thus causing the axle to automatically "trail" accurately just as in the case of the tandem axles of Figs. 1-27. In the present instance, of course, we are only dealing with a single rear axle and in this case this trailing feature is not such a vital feature as in the case of the tandem axles. Nevertheless it is considered to be of value in even this case as it takes care automatically of inaccuracies of rear axle alignment on the frame and also any inaccuracies in the relationship of the front wheels to their steering linkage. In addition to this, when the vehicle is rounding a curve or is otherwise subjected to heavy lateral forces, it reduces the tendency to tire scuff by causing the axle to swing to a slight angle relatively to the frame and to "trail" outwardly so as to allow a certain amount of lateral body movement and thereby reduce the effect of the lateral force.

*Figure 33*

This figure discloses a modified form of semi-elliptic leaf spring in which all of the leaves 143 of the leaf spring are of equal length, and in which, furthermore, the maximum stress to which the different portions of the leaves are subjected is limited by so forming the lower face of the frame member 144 as to provide a curvilinear, limiting abutment 145. The action of this abutment 145 is similar to the action of the curvilinear faces 94 of the resilient shackle shown in Figs. 12-16, in that primary movements of the leaves 143 cause said leaves to first make contact at a successive outward point starting close to their point of support (the U bolt 146) at which time the metal in the leaves at this point has been allowed to reach its maximum allowable stress and then restrained against further stress, and to then allow further spring flexure by allowing the successive outer parts of the spring to flex until they too have reached a maximum allowable stress and then prevented from being strained further.

The principal advantage of such a spring is that it permits of a very accurately controllable geometric rate of resilient resistance with an unusually "soft" initial flexure, and also that it permits an accurate control of all of the stresses so that those portions of the leaves which are subjected to the greater number of vibrations throughout their entire life can be given a smaller maximum stress.

*Figures 34, 35*

This construction illustrates how "lateral cushioning," self-steering and other advantages of the present invention may be obtained when helical springs are used as the resilient restraining means. In this case the levers 62q are relatively long and are pivoted to a bar 146 secured centrally and longitudinally of the vehicle frame on the two cross frame members 147, 148.

Resilient resistance to upward movement of each of the levers 62q is obtained by the use of a pair of helical spring nests 150, each nest consisting of an outer helical spring 151 and an inner helical spring 152, as shown in Fig. 35. The inner spring 152 is relatively short and does not come into operation until its companion lever 62q has moved a certain distance and, as a consequence, the spring nests taken as a unified whole provide a resilient resistance which is geometric and not arithmetic in nature.

*Figures 36, 37*

This construction is similar to that of Figs. 34, 35 except that rubber springs 153 are used instead of helical springs. These rubber springs 153 also provide a geometric resilient resistance, but it is not deemed necessary to explain their action in detail more than to say that each rubber spring consists of three metal rings of different diameter and arranged one above the other and encasing a single core of rubber whose deformation is controlled by said rings.

It will be noted in Fig. 36 that the frame bar 154, upon which the levers 62r are fulcrumed, slopes rearwardly and downwardly so as to enable each of the vehicle wheels to move rearwardly when it rises and move forwardly when it descends so as to permit said wheel to maintain a uniform peripheral speed over rough ground without jerking the frame back and forth. This is similar to the arrangement of the axis of pivots 61, 61a in the construction of Figs. 1-19. In a similar manner, also, the shackles 64r slope upwardly and inwardly to provide lateral cushioning and also slope upwardly and rearwardly which latter characteristic, in combination with the upward and inward slope, renders the axle self-steering as previously explained.

*Figures 38, 39*

This construction bears a superficial resemblance to that of Figs. 34, 35 but is actually quite different. In this case each end of the drive axle 58s is connected through a pair of shackles 64s with a Y shaped lever 62s pivoted at 61s to the vehicle frame 50s. These connections carry all of the torque forces emanating from the axle. Resilient resistance to movement of the lever 62s is derived from a helical spring 150s which is interposed between one side of the vehicle frame and an intermediate portion of a depressing lever 155. The latter is pivoted at 156 to the vehicle frame and pivoted at 157 to the lower end of a relay link 158 whose upper end is pivoted at 160 to aforesaid Y lever 62s. The depressing lever 155 may be very light in construction as it only carries vertical loads and even these it is relieved of when they become too heavy, the various linkages being so arranged that a plane passing through the shackles 64s intersects the axis of pivot 61s before the coils of the helical spring 150s come into direct contact with each other.

Figures 40, 41

The metal, resilient shackles of the previous figures had, as one of their chief functions, the allowing of the axle to move longitudinally a limited amount against a resilient resistance so as to allow the axle to move back and forth, without jerking the frame, when one or both of the wheels is travelling at a uniform peripheral speed along a rough road, in which case the horizontal component of the movement of their axes is not constant. Metal kick shackles, such as those heretofore described, have been found in actual practice to be very efficient in accomplishing this result. However, for very light and/or inexpensive vehicles it is desirable to have a lighter and less expensive substitute for such metal, resilient shackles and in Figs. 40 and 41 are shown two forms of such a kick shackle substitute which can also be used in addition to flexible kick shackles, if desired. In these Figs. 40 and 41, however, only rigid kick shackles are illustrated.

Fig. 40 shows a form of the invention in which the main actuating, bifurcated lever 62t is resiliently restrained against rotation by a longitudinal torsion rod 161 which is axially in line with the fulcrum 61t of said lever. The hubs 161 of this lever are welded to a sleeve 162 whose opposite ends are fulcrumed on the vehicle frame 50t in journal boxes 163, as best shown in my patent application for Vehicle suspension, Serial No. 85,726, filed June 17, 1936. The front end of said sleeve 162 is secured to a cap 164 which is, in turn, connected detachably to the front end of the torsion rod 161.

The bifurcated lever 62t normally projects horizontally outward from its fulcrums 163 and is pivoted at its outer end at 166 to the lower ends of a pair of rigid shackles 167. These rigid shackles extend upwardly and inwardly from said pivots 166 (this Fig. 40 is a "developed" view it must be remembered) and are clamped at their upper ends to an axle pivot pin 168. The latter is rotatably and slidably mounted in the upper end of the axle post sleeve 169 of a companion axle post 170. The shackles are held in spaced relation by a pair of thrust washers 171, a pair of hardened and ground bushings 172 and a central spacing sleeve 173. The axle post is provided with a pair of bearing bushings 174 which are adapted to both rotate on and slide longitudinally on their companion hardened bushings 172.

Interposed between each thrust washer 171 and the companion dust cover 175 at the adjacent outer end of the axle post 170 is a rubber washer or other resilient member 176. Each of these resilient members could be arranged to sustain both compression and tensile stresses but it is deemed more commercially economic to arrange them to resiliently resist compressive loads only, and to place one resilient member at each end of the axle pivot pin 168, as shown. These two resilient members cooperate to resiliently urge the axle post 170 (and hence its companion end of the axle) toward the central position shown, but permit a limited amount of longitudinal movement of said axle post 170 relatively to the axle pivot pin 168. This is the equivalent of a pair of resilient shackles in that it allows the vehicle frame to travel over a rough road at a uniform speed despite the fact that the vehicle wheels rotate at a constant peripheral speed and in doing so require a limited amount of longitudinal freedom of motion to take care of the irregularity in the longitudinal movement of their axes.

In this Fig. 40 is shown a pair of rigid shackles 167, but it is to be understood that flexible shackles such as those shown in Figs. 1-39 may be employed in addition to the resilient members 176 of this Fig. 40, if it is desired to obtain a relatively large freedom of longitudinal axle movement.

Fig. 41 illustrates a similar application of the use of rubber washers 176u except that in this case it is applied to a construction in which there is no torsion rod arranged coaxially with the fulcrum pin 162u, and in which all of the longitudinal sliding is done by this fulcrum pin and not by the axle pivot pin 168u or actuating pin 166u. In this construction the main, bifurcated lever 62u is journaled on the fulcrum pin 162u on anti-friction bearings 178. Said fulcrum pin is firmly clamped to a pair of hardened and ground bearing sleeves 180 by a pair of clamping, end nuts 181. Each of these sleeves is adapted to longitudinally slide within the bore of a companion, self-aligning, spherical head 181, each of the latter being suitably spherically journaled on the main frame 50u in a companion spherical bearing box 182. The use of these spherical heads is principally in the manufacture and assembly of the spring suspension and is ordinarily of no value after being installed unless the frame becomes twisted, in which case the spherical feature again becomes effective and prevents binding of the fulcrum pin 162u.

In operation, said fulcrum pin 162u is resiliently urged toward its central position by a pair of rubber washers or other resilient members 176u, but is allowed to move a small distance longitudinally in the one or other direction, together with the companion end of the axle to which it is attached.

Figures 42, 43

Fig. 42 shows a construction similar to that of Fig. 40 in that the axle post 170v is longitudinally slidable relatively to the stiff shackles 64v, 64tv, against a resilient resistance which in this case is adjustable and is obtained from a pair of helical springs 176v. This longitudinal sliding, whereby longitudinal cushioning of the vehicle body is obtained, may be employed either with or without the resilient forms of kick shackles shown in Figs. 1-39.

Arranged at the upper end of the axle post 170v, in its tubular axle-post sleeve 169v, is a pair of anti-friction bearing bushings 174v having transverse, annular flanges at their outer ends. Slidably and rotatably arranged within the bore of said bearing bushings is a hardened and ground axle pivot pin 168v. The one end of said pivot pin is tapered to enable it to be rigidly secured to the upper end of a non-slidable shackle 64v, while the other end of said pivot pin is threaded to receive the threaded bore of an adjusting collar 183.

This collar and the inner face of the non-slidable shackle 64v are each equipped with a pair of inwardly-extending, curvilinear, turning jaws 184 which are symmetrically and concentrically disposed relatively to the axis of the axle pivot pin 168v. Between each pair of said turning jaws 184 is disposed a pair of curvilinear turning jaws 185 which project integrally and outwardly from the outer face of a companion thrust head 186, the latter being provided with an annular, lateral flange at its inner end arranged to make rubbing contact with the outer face of its companion bearing bushing 174v.

Arranged between the inner face of the non-slidable shackle 64v and the outer face of the flange of its companion thrust head 186 is arranged a helical compression spring 176v, while a similar spring is disposed between the outer face of the other thrust head 186 and the inner face of the adjusting collar 183. These springs tend to longitudinally centralize the axle post 170v, and hence its companion end of the axle, relatively to the axle pivot pin 168v and the vehicle frame. Conversely, the axle is enabled to move longitudinally in the one or other direction relatively to the vehicle against the resilient resistance of the springs. The effective resistance of the two springs acting together is exactly twice as much as the resistance of either one acting alone, despite the fact that the one is expanding and the other contracting. This is only true, however, so long as neither spring is completely unloaded and in the present invention this never occurs. The resistance to movement is arithmetic, as far as the springs are concerned, but the movement is also resisted by sufficient frictional resistance to dampen any tendency toward periodic vibration. What frictional resistance is imposed, as a result of longitudinal movement, is inevitably accompanied by a rotative movement of the axle pivot pin 168v relatively to the bearing bushings 174v, as will be subsequently explained.

To prevent the access of dirt and water to the bearings and to prevent the excessive loss of oil or grease therefrom, the non-slidable shackle 64v and the adjusting collar 183 are provided, respectively, with inwardly extending, annular flanges 188, 188v into whose bores are welded dust tubes 190, 190v. The bore at the inner end of each of these dust tubes bears against the peripheral surface of a felt sealing ring 191 which is received within a suitable annular rabbet 192 formed at the outer portions of the ends of the axle post sleeve 169v. Other means of excluding dirt and water and holding in the oil or grease may, however, be used instead of the particular means shown.

Secured to the smooth peripheral surface of the adjusting collar 183 is a shackle 641v, the upper end of said shackle being longitudinally split at 192 and its upwardly protruding ears 193 clamped together by a clamping bolt 194. The adjusting collar 183 is also split longitudinally, either diametrically as shown or otherwise, so that when the clamping bolt 194 is tightened it squeezes the rear end of said adjusting collar 183 together so as to clamp said collar to the axle pivot pin 168v and at the same time squeezes the two upper ends of the shackle 641v together so as to clamp said shackle to said adjusting collar.

Arranged outwardly and below the axle pivot pin 168v and disposed parallel thereto is a crank arm pin 63v. The one end of the latter is tapered at 195 and provided with a binding nut 196 which enables the pin to be firmly secured to the lower, outer end of the non-slidable shackle 64v. Said crank arm pin 63v is rotatably journaled in a pair of bushings 197 which are located in opposite ends of the bore of a crank pin sleeve 198. The latter is arranged at the outer end of a companion crank arm, such as that shown at 62t in Fig. 40 or the outer end of a lever, such as that shown at 62 in Fig. 5.

The right end of the crank arm pin 63v is threaded to receive a lower adjusting collar 200 which is longitudinally split at 201, similarly to the upper adjusting collar 183. The periphery of said lower adjusting collar 200 is gripped by the lower end of the shackle 641v which is longitudinally split at 202 and has its ears 203 drawn together by a lower clamping bolt 204. The latter not only clamps the lower end of said shackle 641v to the lower adjusting collar 200 but also clamps the latter upon the threaded end of the crank arm pin 63v. To ensure against longitudinal movement of the shackle 641v relatively to said lower adjusting collar 200, the latter is peripherally grooved at 205 and this groove engages with the shank of aforesaid, lower, clamping bolt 204.

The assembly of the various parts shown in Fig. 42 is as follows:

The non-slidable shackle 64v is first firmly secured to the axle pivot pin 168v and crank arm pin 63v and this combination then placed in the position shown in the drawings, together with the various springs, bushings, etc. The upper adjusting collar 183 is then screwed down until the desired spring tension is obtained. The lower adjusting collar 200 is then screwed down hard and backed off a sufficient distance to give the moving parts the necessary freedom of movement. The slidable shackle 641v is then slid over the ends of the upper and lower adjusting collars 183, 200 and the lower clamping bolt 204 pushed into place in engagement with the peripheral groove 205 of the lower adjusting collar 200 and tightened up. The top clamping bolt 194 is then pushed into place and tightened up. After the spring suspension has been in service a considerable length of time, any wear that may have occurred bay be taken care of by loosening the slidable shackle 641v, adjusting the upper and lower adjusting collars 183, 200 and then again tightening up the upper and lower ends of said adjusting shackle 641v.

Fig. 43 illustrates how most of the parts shown in Fig. 42 may be used when it is desired to have a linkage substantially like that in Fig. 42, but without permitting longitudinal movement of the axle post 170u relatively to the vehicle frame.

I claim as my invention:

1. A vehicle spring suspension comprising: a frame; a pair of levers fulcrumed on said frame and normally extending outwardly therefrom; an axle having a pair of spindles each having a wheel journaled thereon; means movably connecting each spindle with the outer part of the corresponding lever and adapted to allow said axle to move relatively to said lever in a direction transverse of the vehicle; and resilient means connected with said frame and engaging with each of said levers at a point located more than two-thirds the length of said lever beyond its fulcrum.

2. A vehicle spring suspension comprising: a frame; a lever fulcrumed on said frame and normally extending outwardly therefrom; a spindle having a wheel journaled thereon; a shackle connecting said spindle and said lever and extending upwardly and inwardly from said lever to said spindle; and resilient means connected with said frame and engaging with said lever at a point located beyond its fulcrum.

3. A vehicle spring suspension comprising: a frame; a lever fulcrumed on said frame and normally extending outwardly therefrom; a spindle having a wheel journaled thereon; means for resiliently restraining movement of said spindle relative to said frame; and pivotal means connecting the outer end of said lever with said spindle, the axis of said pivotal means being angularly disposed relatively to the longitudinal axis of the vehicle.

4. A vehicle spring suspension comprising: a frame; a lever fulcrumed on said frame and normally extending outwardly therefrom; a spindle having a wheel journaled thereon; means for resiliently restraining movement of said spindle relative to said frame; and pivotal means connecting the outer end of said lever with said spindle, the axis of said pivotal means being angularly disposed relatively to a vertical plane intersecting the longitudinal axis of the vehicle.

5. A vehicle spring suspension comprising: a frame; a lever fulcrumed on said frame and normally extending outwardly therefrom; a spindle having a wheel journaled thereon; means for resiliently restraining movement of said spindle relative to said frame; and pivotal means connecting the outer end of said lever with said spindle, the axis of said pivotal means being angularly disposed relatively to a horizontal plane intersecting the longitudinal axis of the vehicle.

6. A vehicle spring suspension comprising: a frame; a lever fulcrumed on said frame on an axis which lies in a vertical plane disposed parallel to a vertical plane intersecting the longitudinal axis of the vehicle; means for resiliently restraining movement of said lever; a spindle having a wheel journaled thereon; and pivotal means connecting the outer end of said lever with said spindle, the axis of said pivotal means being angularly disposed relatively to the longitudinal axis of the vehicle.

7. A vehicle spring suspension comprising: a frame; a lever fulcrumed on said frame on an axis which lies in a horizontal plane intersecting the longitudinal axis of the vehicle; means for resiliently restraining movement of said lever; a spindle having a wheel journaled thereon; a pivotal means connecting the outer end of said lever with said spindle, the axis of said pivotal means being angularly disposed relatively to the longitudinal axis of the vehicle.

8. A vehicle spring suspension comprising: a frame; a lever fulcrumed on said frame and normally extending outwardly therefrom; a spindle having a wheel journaled thereon; means for resiliently restraining movement of said spindle relative to said frame; and pivotal means connecting the outer end of said lever with the spindle, the axis of said pivotal means being angularly disposed relatively to the fulcrum of said lever.

9. A vehicle spring suspension comprising: a frame; a lever fulcrumed on said frame and normally extending outwardly therefrom; a spindle having a wheel journaled thereon; a shackle extending upwardly from said lever and movably connecting said spindle and said lever; a rocking head pivoted on said lever to swing about an axis generally parallel with the line of movement of the vehicle; a link connected at one end to said rocking head and depending therefrom; and resilient means connecting the lower end of said link with the frame.

10. A vehicle spring suspension comprising: a frame; a lever fulcrumed on said frame; a spindle having a wheel journaled thereon; means connecting said spindle and said lever; a crank shaft pivotally mounted on said frame and having a crank pin; means for resiliently restraining rotation of said crank shaft; and a leaf spring operatively connected with said frame, said spindle and said crank pin.

11. A vehicle spring suspension comprising: a frame; a lever fulcrumed on said frame; a spindle having a wheel journaled thereon; a crank shaft having a crank pin; means operatively connecting said crank pin and said spindle; and a sleeve constructed of plastic material and connected with said frame and encircling a portion of said crank shaft and adapted to resiliently restrain rotation of said crank shaft.

12. A vehicle spring suspension comprising: a frame; a spindle having a wheel journaled thereon; a primary spring connecting said spindle with an adjacent portion of said frame; and a secondary spring connecting said spindle with the opposite end of said frame.

13. A vehicle spring suspension comprising: a frame; a lever longitudinally fulcrumed on said frame; means for resiliently restraining movement of said lever about its fulcrum relatively to said frame; a spindle having a wheel journaled thereon; means providing an unrestrained pivotal connection between said lever and said spindle; and means for resiliently restraining movement of said spindle relatively to said lever lengthwise of the vehicle.

14. A vehicle spring suspension comprising: a frame; a pair of spaced lever arms fulcrumed on each side of said frame and normally extending outwardly therefrom; an axle having wheels journaled thereon; movable means connecting said axle jointly with all of said lever arms and permitting lateral movement of said axle independently of said lever arms; and resilient means connected with said frame and engaging with said lever arms.

15. A vehicle spring suspension comprising: a frame; a lever having two arms connected together and said arms being fulcrumed on each side of said frame and normally extending outwardly therefrom; an axle having wheels journaled thereon; movable means connecting said axle with said levers and permitting lateral movement of said axle independently of said levers; and resilient means connected with said frame and engaging with said levers.

16. A vehicle spring suspension comprising: a frame; a lever fulcrumed on each side of said frame each with its journal bearings spaced a substantial distance from one another longitudinally of the vehicle, each of said levers normally extending outwardly from said frame; an axle having wheels journaled thereon; movable means connecting said axle with said levers and permitting lateral movement of said axle independently of said levers; and a single resilient means connected with said frame and engaging with each of said levers.

17. A vehicle spring suspension comprising: a frame; a pair of spaced lever arms fulcrumed on each side of said frame and normally extending outwardly therefrom; an axle having wheels journaled thereon; movable means connecting said axle jointly with all of said lever arms and permitting lateral movement of said axle independently of said lever arms; and resilient means connected with said frame and engaging with one of said lever arms at a point having a leverage about its fulcrum equal to more than one-half the leverage about said fulcrum of the movable means which connects each end of said axle with its companion pair of lever arms.

18. A vehicle spring suspension comprising: a vehicle frame; a pair of levers fulcrumed on said frame, the pivotal connection between each lever and the frame being arranged inside of said frame and the said levers projecting normally outwardly under said frame to the exterior thereof; an axle having wheels journalled thereon; a link connecting each end of said axle with the outer part of each lever; and resilient means mounted on said frame and engaging with each of said levers at a point located more than two thirds of the length of said lever beyond its fulcrum.

19. A vehicle spring suspension comprising: a vehicle frame having main side members; a bracket secured to each of said main side members and extending downwardly and inwardly therefrom; a lever pivoted to the lower end of each of said brackets and normally extending outwardly therefrom beyond said side members; an axle having a pair of wheels journalled thereon; a link connecting each end of said axle with the outer part of each lever; and resilient means mounted on said frame and engaging with each of said levers at a point located more than two thirds of the length of said lever beyond its fulcrum.

20. A vehicle spring suspension comprising: a frame; a pair of levers fulcrumed on said frame and normally extending outwardly therefrom, each of said levers having a pair of journal bearings spaced from one another lengthwise of the vehicle; an axle having a pair of wheels journalled thereon; a pair of shackles spaced from one another lengthwise of the vehicle and connecting each end of said axle with the outer end of the corresponding lever said journal bearings and shackles being so spaced to resist all brake and drive torque; and resilient means mounted on said frame and engaging each of said levers at a point between its fulcrum and its shackles and resisting downward movement of said frame.

21. A vehicle spring suspension comprising: a frame; a pair of outwardly extending levers fulcrumed on said frame to swing about an axis extending generally parallel with the line of movement of said vehicle and each of said levers having a pair of journal bearings spaced from one another lengthwise of the vehicle; an axle having wheels journalled thereon, a pair of shackles spaced from one another lengthwise of the vehicle and connecting each end of said axle with the outer end of the corresponding lever; and resilient means mounted on said frame and engaging each of said levers at a point located more than two thirds of the length of said lever beyond its fulcrum, said levers, shackles and resilient means comprising the sole means for supporting said vehicle frame on said axle and resisting all brake and drive torque.

ALBERT F. HICKMAN.